United States Patent [19]
Ryu et al.

[11] Patent Number: 5,586,326
[45] Date of Patent: Dec. 17, 1996

[54] OBJECT BASE DATA PROCESSING APPARATUS

[75] Inventors: Tadamitsu Ryu; Naomi Ichikawa; Masahiko Murakawa; Masanobu Toyota; Takeshi Adachi, all of Kawasaki, Japan

[73] Assignee: Fujitsu Limited, Kawasaki, Japan

[21] Appl. No.: 179,047

[22] Filed: Jan. 7, 1994

[30] Foreign Application Priority Data

Jan. 12, 1993 [JP] Japan ............... 5-003496

[51] Int. Cl.⁶ .................................. G06F 7/00
[52] U.S. Cl. ................ 395/701; 364/974; 364/DIG. 2; 364/282.1; 364/281.3; 364/DIG. 1
[58] Field of Search ............... 395/650, 700, 395/600, 672, 710, 711; 364/974

[56] References Cited

U.S. PATENT DOCUMENTS

| | | | |
|---|---|---|---|
| 4,819,160 | 4/1989 | Tanka et al. | 364/300 |
| 5,161,225 | 11/1992 | Abraham et al. | 395/600 |
| 5,187,786 | 2/1993 | Densmore et al. | 395/600 |
| 5,257,371 | 10/1993 | Anazaki | 395/650 |
| 5,265,206 | 11/1993 | Shackelford et al. | 395/200 |
| 5,283,898 | 2/1994 | Kusumoto et al. | 395/650 |
| 5,295,256 | 3/1994 | Bapat | 395/500 |
| 5,297,279 | 3/1994 | Bannon et al. | 395/600 |
| 5,313,629 | 5/1994 | Abraham et al. | 395/600 |
| 5,313,630 | 5/1994 | Namioka et al. | 395/600 |
| 5,313,633 | 5/1994 | Tomita et al. | 395/700 |
| 5,355,474 | 10/1994 | Thuraisngham et al. | 395/600 |
| 5,361,350 | 11/1994 | Conner et al. | 395/600 |

*Primary Examiner*—Kevin A. Kriess
*Assistant Examiner*—Michael T. Richey
*Attorney, Agent, or Firm*—Staas & Halsey

[57] ABSTRACT

An object base data processing apparatus executes a desired process by naming, as objects, single processing units and/or composite processing units which include single processing units and combines the objects. A parts attribute file stores the object parts using entity data forming the objects and meta data describing a nature of the objects, methods and/or classes for realizing individual processes, which are information groups in a procedural world, stored as objects. An object management unit communicates with the object parts in the parts attribute file to execute the desired process. A class schema describes a method name for at least one method entered in the class by combining at least one of the methods into the class. An instance schema generates an instance linked to a method specified by the class schema. The object parts correspond to the composite processing unit linking the methods described in the class schema and contents of the instance schema. The desired process is given by a static model, specifying an existence of class groups and/or the method groups and mutual relationships of the class groups and/or the method groups; and a dynamic model specifying an existence of instance groups and time sequential relationships of the instance groups. Progress of a process of the instance in the dynamic model is executed by collation with cause and effect relationships among the classes in the static model.

5 Claims, 22 Drawing Sheets

5,586,326

OBJECT BASE DATA PROCESSING APPARATUS

BACKGROUND OF THE INVENTION

The present invention generally relates to object base data processing apparatuses. More particularly, the present invention relates to an object base data processing apparatus which stores a method and/or class which realizes each process as one object in an information group of a procedural world. A desired target process is modeled by a static model and a dynamic model so that it is possible to freely cope with various requests of the desired target process. The static model is a model of the relationship including upper layer and lower layer relationships among the class and/or method groups, the dynamic model is a model of the time sequential relationship among the instance groups, and the layer indicates the layer of a hierarchy relationship.

First, a description will be given of a conceivable method of forming a capsule of objects, with reference to FIGS. 1A through 1C.

For example, execution process data 214 are made up of a series of instructions (or instruction groups) 250(1)–(5) shown in FIG. 1A which are serialized in the processing sequence. A number of such instructions (or instruction groups) 250 form a processing unit 251 which executes a predetermined process, or specifically, makes a certain behavior.

Accordingly, the execution process data 214 shown in FIG. 1A may be regarded as a collection of the processing units 251(1)-n which are serialized in the processing sequence as shown in FIG. 1B, where each processing unit 251 makes a certain behavior. The serialized execution process data 214 shown in FIG. 1B as a whole carry out a specific operation. Hence, the execution process data 214 for carrying out another specific operation is a connection of the processing units 251 (1)-n having a different combination.

As the number of existing processing units 251 which make different behaviors becomes large, the individual processing units 251i are integrated under a predetermined method M as shown in FIG. 1C, so as to obtain an integrated processing unit group which carries out the same operation as the execution process data 214 shown in FIG. 1B.

Next, a description will be given of particular examples of the relationships of the object, the object command and the object part.

FIG. 2 shows a real world, or more specifically, an example of a model for departments of a company. Within a box 610 representing "employees" in FIG. 2, there is a "secretary" 614 belonging to a "work type=1" 612, a "leader" 618 belonging to a "work type=2" 616, and a worker 622 belonging to a "work type=3" 620. A box representing "employees" 610 belongs to a box representing a "team" 602.

The "leader" 618 is related to the "team" 602 under the relationship "team leader" 608. In addition, the "worker" 622 is related to a "machine" 630 under the relationship "worker/machine" 628 within the box representing "work unit" 640.

The "team" 602 and the "machine" 630 are related under the relationship "workshop of machine" 624. The "worker" 622 and the "machine" 630 are related under the relationship "worker/machine" 628. In addition, the "employee" 610 and the "department/employee" 604 are related under the relationship "department" 606.

Furthermore, the "employee" 610 and the "position" 636 are related under the relationship "employee/attribute" 632. The "work unit" 640 and the "part" 638 are related under the relationship "work unit/part" 634.

The following relationships also exist.

(1) The "department" 606 is related to the object "department name" 650 and the object "dollars" 652.

(2) The "team" 602 is related to the object "name" 654 by a team identification number, related to the object "employee no." 656 by the work type, related to the object "code" 658, "name" 660 and the object "surname" 662 by the name, related to the object "dollars" 664 by the salary, related to the object "dollars" 666 by the average salary, and related to the object "no." 668 by the average number of departments.

(3) The "secretary" 614 is related to the object "no." 670 by the typing speed.

(4) The "position" 636 is related to the object "name" 672 by the name, and related to the object "year" 674 by the age.

(5) The "part" 638 is related to the object "no." 676 and the object "dollars" 690.

(6) The "work unit/part" 634 is related to the object "no." 688 by the volume.

(7) The "work unit" 640 is related to the object "time" 686 by the required time.

(8) The "machine" 630 is related to the object "machine no." 680, the object "value dollars" 682 and the object "machine name" 684.

(9) The "machine/work" 626 is related to the object "time" 678 by the time used.

The model shown in FIG. 2 can generally be represented as shown in FIG. 3 if the "behavior" (or method) is indicated by a circular box, the "data" is indicated by a rectangular box, and the "relationship" is indicated by a rhombic box. In other words, (1) a method "a" 702 and a data "I" 704 are combined and function as one larger data "IV" 706, (2) methods "b" 708 and "c" 714 are related to a data "II" 712 by a relationship "α" 710 and function as one large data "V" 716, (3) methods "c" 714 and "d" 726 are related to a data "III" 730 by a relationship "β" 728 and function as one larger data "VI" 724, and (4) a method "e" 720 is related to data "IV" 706 and "V" 716 by a relationship "γ" 718 and function as still a larger data "VII" 722. In other words, the behaviors (or methods) are gathered and represented as a larger group.

Each circular shape, rectangular box and rhombic box shown in FIG. 3 can be treated as an individual object.

The forming of a capsule shown in FIG. 4A will now be considered for a collection of the method "a" 702 and the data "I" 704 shown in FIG. 3. In FIG. 4A, an opening is formed at the top of the capsule to indicate that a message communication can be made. If this opening of the capsule were closed as shown on the left side of FIG. 4B, such a capsule would then correspond to the data "IV" 706 which is a collection of the method "a" 702 and the data "I" 704 in FIG. 3. If a composite object is obtained by adding a method "M₁" 746 to the data "D₂" 748 (capsule) shown on the left side of FIG. 4B, the data shown at the central part of FIG. 4B is obtained. Further, if a composite object is obtained by further adding a method to the data shown at the central part of FIG. 4B, the data shown on the right side of FIG. 4B is obtained. Hence, FIG. 4B shows the formation of composite objects by successively adding methods.

The formation of the composite objects is not limited to that shown in FIG. 4B. For example, the composite objects may be formed as shown in FIG. 4C. In FIG. 4C, the data "$D_1$" 762 of the object shown on the leftmost side is replaced by an object which is made up of a method $M_2$ 766 and a data $D_2$ 768, as shown on the second leftmost side. In this case, a message passing is required between a method "M1" 760 and a data "D1" 762, and the method "M1" 760 becomes one object 780 as shown on the second rightmost side in FIG. 4C. As a result, objects "A" 780 and "B" 762 exist within an object "C" 764, and the message passing exists between the objects "A" 780 and "B" 762.

Furthermore, if the method "$M_2$" 766 of the object "B" 762 is replaced by an object "B1" 786 and the data "$D_2$" 768 of the object "B" 762 is replaced by an object "B2" 788, both the object "B1" 786 and "B2" 788 exist within the object "B" 762 and the message passing exists between the objects "B1" 786 and "B2" 788 as shown on the rightmost side in FIG. 4C.

Therefore, the composite objects are formed by successively combining the objects. For example, the so-called primitive objects which will be described later are combined to form a capsule object, the capsule objects are combined to form an event object, and the event objects are combined to form a system object.

The data "D" described above generally includes a plurality of processing units which are the subject of the processing. On the other hand, the method "M" may be considered as information or information group instructing how the plurality of processing units are to be utilized. The object which is represented in FIG. 4 is a "processing unit" which is treated as an individual "processing unit" or a collection of "individual processing units".

As shown in FIG. 3, the individual objects "I" 704, "II" 712 and "III" 730 form a part of the larger objects "IV" 706, "V" 716 and "VI" 724. In addition, the objects "IV" 706, "V" 716 and "VI" 724 form a part of still a larger object "VII" 722. In other words, the objects "IV" 706, "V" 716 and "VI" 724 are in an "is-a" relationship or a "part-of" relationship with the object "VII" 722 when viewed from the object "VII" 722.

If the objects "I" 704, "II" 712 and "III" 730 are regarded as minimum units, these objects "I", "II" and "III" may be said to be primitive objects. The capsule object is formed by a collection of such primitive objects. The event object is formed by a collection of such capsule objects. Furthermore, a still larger system object is formed by a collection of such event objects.

The objects described above which are made up of a collection of smaller objects are respectively referred to as a composite object. The primitive object is included in the concept of the composite object. However, the primitive object is an object of the minimum unit as described above. For this reason, when a reference is generally made to a "composite object" or an "object", it is better to exclude the primitive object which exists by itself and cannot be decomposed further.

The object in the capsule form is generally made up of the composite objects described above in the capsule form.

The individual objects can be represented by the following model. That is, FIG. 5 is a diagram for explaining the object as a model.

A thing of the real world 800, such as a photograph 802, can be specified by a name 804 which describes the photograph 802, and a nature 806 of the photograph 802. The nature 806 of the photograph 802 indicates what kind of picture the photograph 802 is, such as the person who took the picture and the time when the picture was taken. Hence, the photograph 802 can be represented by a model using (i) a command 808 which is used as the name specifying the photograph, (ii) an actual picture (entity data) 810 of the photograph formed by black and white dots, and (iii) a link 812 which describes the nature 806 of the photograph, the location where the actual picture is stored, the relationship of the people in the photograph and the like.

The individual object described above can also be represented by a model such as that shown in FIG. 5 using the command 808, the link 812 and the entity data 810.

FIG. 6 is a diagram for explaining the functions of the object as a model. As shown on the left side of FIG. 6, the object can be described using the common 808, the link 812 and the entity data 810. It may be regarded the dot data 820 shown in FIG. 6 is given to the entity data 810. The capsule object, the event object and the system object are generally given a description specifying other objects X 822, Y 824 and Z 826 as the entity data, related to these other objects X 822, Y 824 and Z 826, and use entity data x 830, y 832 and z 834 of these other objects X 822, Y 824 and Z 826 as shown on the right side of FIG. 6.

A method of treating as one processing unit, an object part which is written with entity data and meta-data, was previously proposed in an United States Patent Application (Serial Number not yet known) filed Aug. 26, 1993 and entitled "DATA PROCESSING APPARATUS FOR CARRYING OUT PROCESS BY COMBINING OBJECTS" in which the assignee is the same as the assignee of the present application, the disclosure of which is hereby incorporated by reference.

FIG. 7 is a diagram for explaining a process of treating the object. An object command 201 shown in FIG. 7 is the same as the commands 808 shown in FIGS. 5 and 6. In other words, the object command 201 is the name for specifying the object. A meta-data 202 shown in FIG. 7 corresponds to the links 812 shown in FIGS. 5 and 6. That is, the meta-data 202 is a data (description of real data) describing the real data with significance, such as the name, comment and command. In addition, the "is-a" hierarchy relationship, the "part-of" hierarchy relationship, and the sequential relationship between the objects are described in the meta-data 202. The comment is a description which significantly describes what the real data is when describing the real data. In other words, the comment may take the form of a general flow chart, a detailed flow chart or a source program. An entity data (real data) 203 shown in FIG. 7 corresponds to the entity data 810 shown in FIGS. 5 and 6, and the program for executing the process is treated as one real data.

A command/link processor 204 shown in FIG. 7 is also referred to as a directory processor. When one new object is formed, a command (also referred to as an object command) which is the name of this object is set. In addition, storage locations for the real data 203 and the meta-data 202 are allocated, and a command/link table is formed. In this case, the type of object is determined, thereby determining the size of the object. Then, measures are taken so that a combination of the meta-data 202 and the real data (entity data) 203 can be input and output using the command/link table. Further, the input/output process is carried out. The above combination of the meta-data 202 and the real data 203 will be named an object part 206. The object part 206 can be specified using the object command.

Therefore, the collection of objects or the composite object is appropriately combined in a modifiable manner depending on the needs, so as to execute the desired process.

As described above in conjunction with FIG. 1, it is conceivable to form a collection of the individual processing units and consider the collection as a whole as the target process. However, even if it were conceivable to consider giving the entire requested target process by the collection of the individual processing units 251 (as shown in FIGS. 1A–C), the individual processing units 251 would simply be connected according to the requested target process each time. For this reason, only a temporizing solution is given each time for every target process, and the past efforts are not reflected to the next design.

SUMMARY OF THE INVENTION

Accordingly, it is a general object of the present invention to provide a novel and useful object base data processing apparatus in which the problems described above are eliminated.

Another and more specific object of the present invention is to provide an object base data processing apparatus which execute a desired process by naming as objects single processing units and/or composite processing units which are combinations of the single processing units and combining the objects, comprising a parts attribute file storing the objects as object parts using entity data forming the objects and meta-data describing nature of the objects, methods and/or classes for realizing individual processes, which are information groups in a procedural world, being stored as one of the objects; an object management unit communicating with the object parts in the parts attribute file to execute the desired process; a class schema describing a method name for one or a plurality of methods entered in the class by combining one or a plurality of methods into a class; and an instance schema generating an instance linked to a method specified by the class schema, the instance including specific instance data replacing variables of general names existing within the class, where the object parts correspond to the composite processing unit linking to the methods or method groups described in the class schema and contents of the instance schema, the desired process is given by both a static mode which specifies existence of class groups and/or the method groups and mutual relationships of the class groups and/or the method groups, and a dynamic model which specifies the existence of the instance groups and time sequential relationships of the instance groups, and progress of a process of the instance in the dynamic model is executed by collation with cause and effect relationships among the classes in the static model. According to the object base data processing apparatus of the present invention, in correspondence with the process requested by the user, for example, the operator introduces the existing methods or classes, or generates new classes, and extracts a program such a formula sufficient to execute the requested process. Then, the introduced methods and classes are used to generate an instance group in which desired instance data are set, and sessions are assembled and executed. As a result, the methods and classes which are formed by the request from the user or the like are successively accumulated and are usable later. The instances are not generated directly. Instead, classes described by general variables corresponding to formulas are generated, and the instances are generated depending on the needs. Hence, the methods and classes are fit for later use, and the results of the efforts are appropriately accumulated.

Other objects and further features of the present invention will be apparent from the following detailed description when read in conjunction with the accompanying drawings.

DESCRIPTION OF THE PREFERRED EMBODIMENTS

Figure 8:
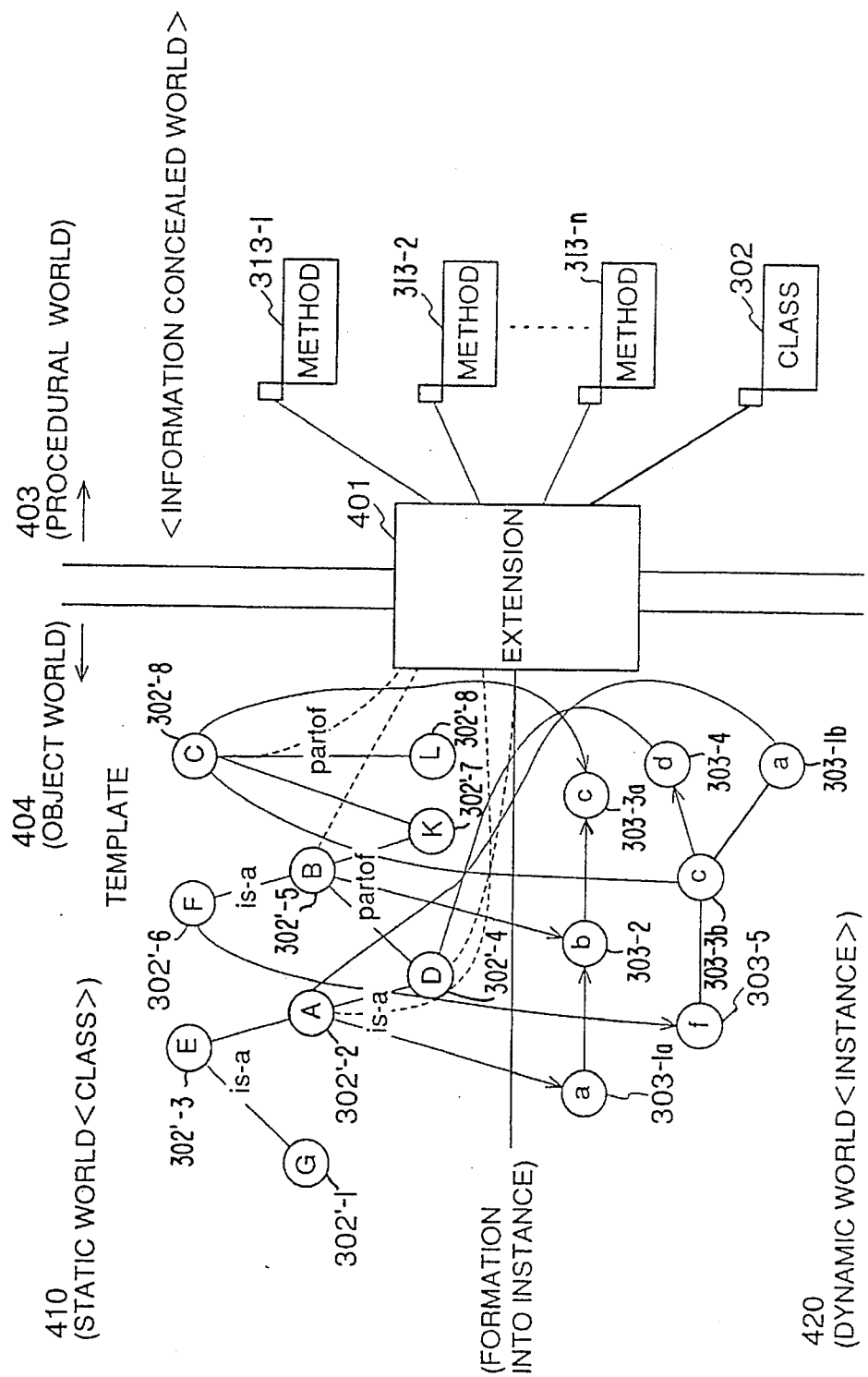
FIG. 8 is a diagram for explaining the operating principle of the present invention.

First, a description will be given of an operating principle of the present invention, by referring to FIG. 8. FIG. 8 shows an extension 401 which corresponds to the extension 804 shown in FIG. 5; a procedural world 403 which corresponds to the connotation shown in FIG. 5; and an object world 404 which represents the model of the real world.

When forming the model of the real world 404 (for example, the requested target process), the present invention uses a static world 410 and a dynamic world 420. The static world 410 specifies a relationship among the classes and/or methods which are required to form the model. On the other hand, the dynamic world 420 specifies a time sequential relationship of processes of the instances which are obtained when forming the model.

The classes and/or methods specified in the static world 410, and composite classes which are respectively obtained by adding or integrating the classes, are represented hereinafter by classes 302'.

On the other hand, a class 302 exists in the procedural world 403 shown in FIG. 8. Instances 303 exist in the dynamic world 420 shown in FIG. 8, and methods 313-1, 313-2, ... 313-n exist in the procedural world 403 shown in FIG. 8.

The methods 313-1, 313-2, ... 313-n are existing processing units for respectively executing the individual processes. In order to execute a more complex process, a plurality of methods are introduced from a group of methods to form a class 302. Further, if necessary, a plurality of classes are introduced from the group of classes and a plurality of methods are introduced from the group of methods to form a composite class in order to execute a more complex process. Such classes 302 and the composite classes respectively correspond to one object unit.

It will be assumed for the sake of convenience that such methods and classes already exist.

For example, suppose that a user requested processing of a target process for a certain kind of process. In the present invention, the classes and methods required to process the target process are introduced in order to process the target process, and the mutual relationships among the classes and methods are determined. The static world 410 describes information related to the mutual relationships.

In the case shown in FIG. 8, A, B, C, D, E, F, G, K and L are introduced as the classes 302'-n for the purpose of processing the target process. (i) The classes G 302'-1 and A 302'-2, respectively, have the "is-a" relationship with respect to the class E 302'-3, (ii) the class D 302'-4 has the "is-a" relationship with respect to the class A 302'-2, (iii) the class B 302'-5 has the "is-a" relationship with respect to the class F 302'-6, (iv) the classes D 302'-4 and K 302'-7, respectively, have the "part-of" relationship with respect to the class C 302'-8, and (v) the classes K 302'-7 and L 302'-8, respectively, have the "part-of" relationship with respect to the class C 302'-8. Actually, the class 302'-n described in the static world 410 is given by use of an identification (ID) or identifier which is sufficient to point the class 302, the method 313-n or the like existing in the procedural world 403.

The classes 302'-n have corresponding relationships to the classes and methods existing in the procedural world 403. In other words, the classes 302'-n are programs for executing the individual processes and are similar to formulas in mathematics, where it may be regarded that the values within the programs are given by general variables. Instances 303-n are obtained by setting instance data with respect to general variables of the classes 302'-n and forming specific programs in which the individual instance data are assembled.

In the dynamic world 420, the processing time sequence of instances a, b, c, ... corresponding to the classes 302'-n introduced in the static world 410 are specified, and the process requested by the user is executed.

As described above, if the user requests processing of a certain target process, for example, the classes A, B, C, D, E, F, K and L are specified in the static world 410 as the classes 302'-n which are required for the processing of the target process. In addition, the relationships such as "is-a" and "part-of" relationships are clarified among the classes 302'-n. Actually, a state table is prepared and the relationships are described in the state table. If restrictions exist among the classes 302'-n in respect of the cause and effect relationship, information related to such restrictions are also described in the state table.

When processing the target process requested from the user, the introduced classes 302'-n are not used as they are. In other words, the instances 303-n in which the individual instance data are set, are used with respect to the general variables within each of the classes 302'-n. In addition, the processing is made according to the time sequential relationship of each of the instances which are processed.

In the case shown in FIG. 8, instances a 303-1a and 303-1b corresponding to the class A 302'-2, the instance b 303-2 corresponding to the class B 302'-5, instances c 303-3a and 303-3b corresponding to the class C 302'-8, the instance d 303-4 corresponding to the class D 302'-4, and the instance f 303-5 corresponding to the class F 302'-6 are generated. In addition, there are shown (i) a session in which the instances a 303-1a, b 303-2 and c 303-3a advance in this sequence, and (ii) a session in which the instances f 303-5, c 303-3b, d 303-4 and a 303-1b advance in this sequence.

When generating instances a 303-1a and 303-1b, the instance a is, of course, generated using the class A 302'-2 which corresponds to the formula. In this case, since the class A 302'-2 has the "is-a" relationship with respect to the class E 302'-3, it is regarded that the contents indicated in the class E 302'-3 are inherited to the class A 302'-2, and the instance a 303-1a is generated using both the classes E 302'-3 and A 302'-2.

On the other hand, since the classes D 302'-4 and K 302'-7, respectively, have the "part-of" relationship with respect to the class B 302-5, the instance b 303-2 is generated using the classes B, D and K.

When executing each session, the state table described above, existing in the static world 410, is inspected and the start of execution of the instance a 303-1a, for example, is written into the state table when starting the execution of the instance a. When the processing of the instance a ends, this end is written into the state table, Hence, the restrictions corresponding to the cause and effect relationship existing in and described in the static world 410 are written into the state table without omission. Of course, new restrictions may be generated, but the new restrictions can be given in correspondence with each of the sessions. For example, such new restrictions may be generated in respect of the cause and effect relationship caused by the assembling of the session under the state where the individual instances a 303-1a, b 303-2, c 303-3a, ... are generated. However, the cause and effect relationship generated when the classes 302'-n are introduced and related in the static world 410 are described in the static world 410, and is inherited to the processing of the session in the dynamic world 420.

Next, a description will be given of an embodiment of an object base data processing apparatus according to the present invention.

Figure 5:
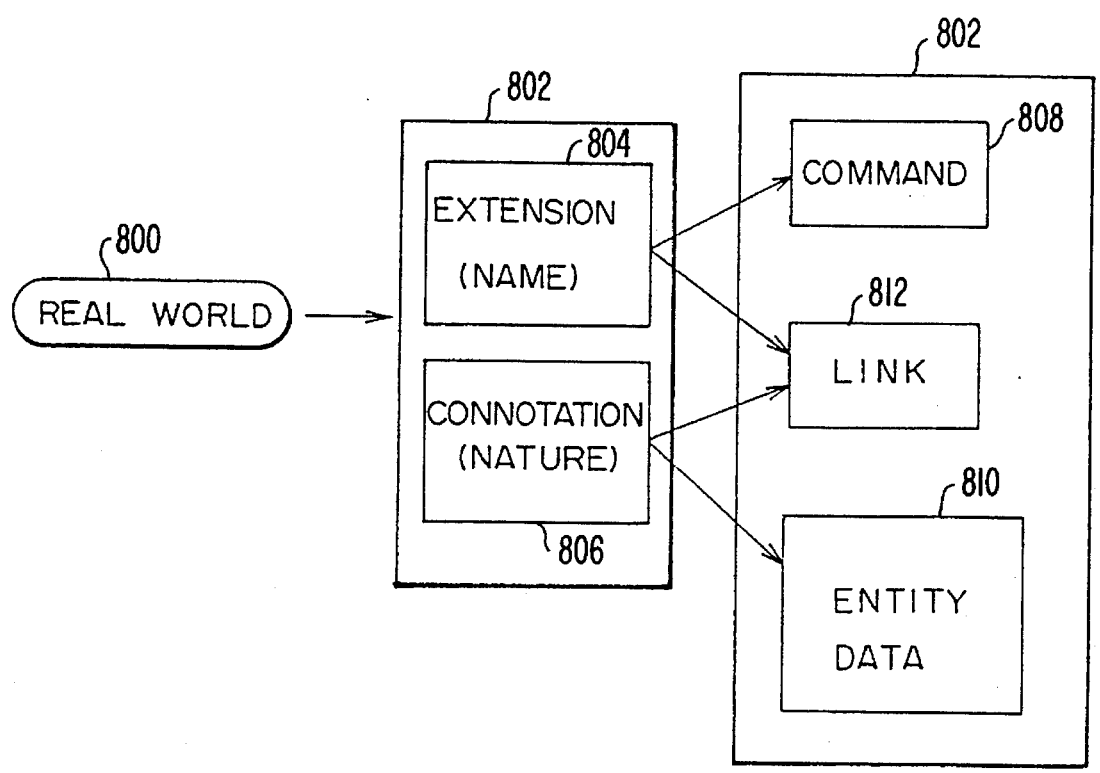
FIG. 5 is a diagram for explaining an object as a model.
Figure 6:
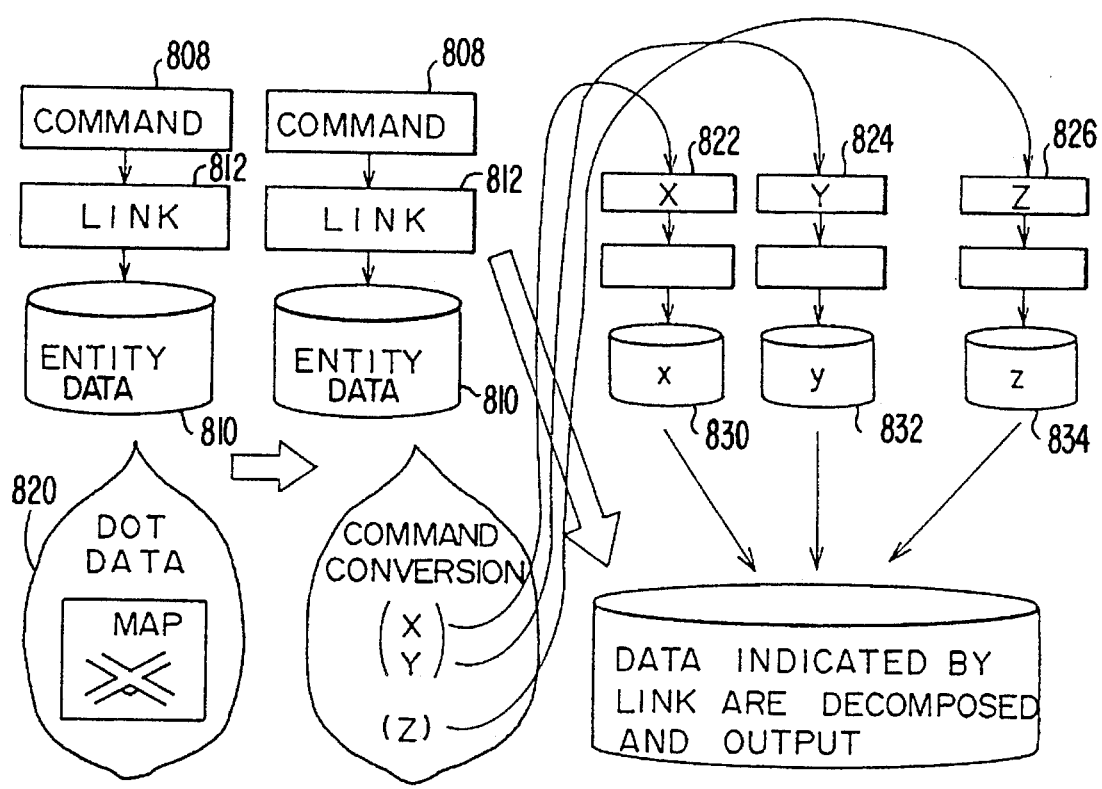
FIG. 6 is a diagram for explaining the functions of the object as the model.

As shown by the model in FIG. 5, the model of the real world (for example, the request of the user) may be formed by making a connotation and an extension correspond to each other, where the connotation gives particular information describing the real world and the extension simply describes the real world. When the exchanging information such as when exchanging information related to a certain real world, it is sufficient to given the extension for this certain real world if the connotations are mutually understood in this certain real world. In other words, there is no need to notify the other of the particular information, and it is sufficient to notify the other of the naming used in the certain real world.

Figure 9:
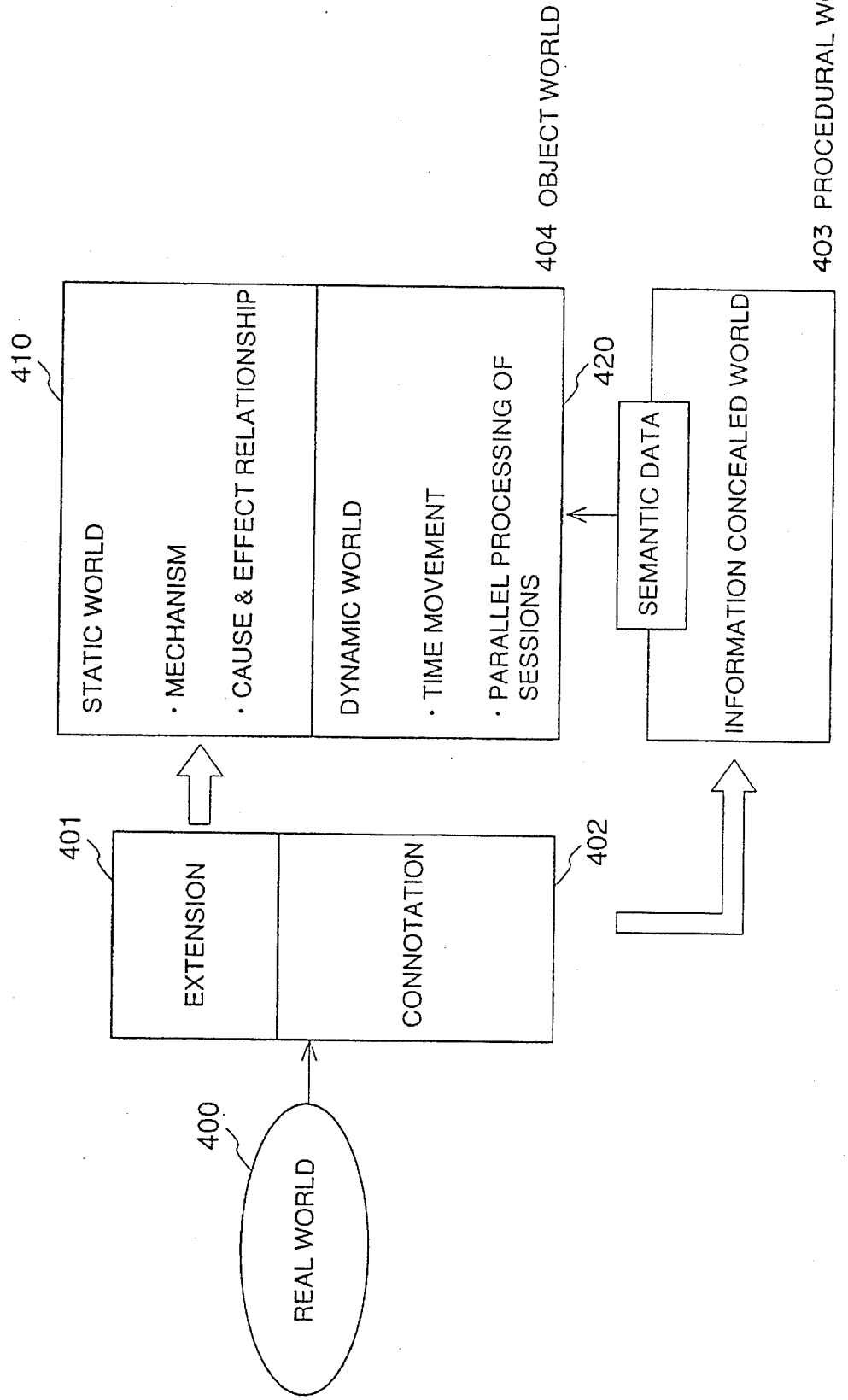
FIG. 9 is a diagram for explaining a static world and a dynamic world.

FIG. 9 is a diagram for explaining the static world and the dynamic world.

For the reasons described above, the information is generally concealed in the connotation. Connotation corresponds to the "information concealed world" or the procedural world 403. On the other hand, the model of the real world 400 can be formed by the static world 410, which gives the construction of the real world 400 and a cause and effect relationship within this construction; and the dynamic world 420, which describes time movements in the real world 400 and indicates whether to permit parallel processing of a plurality of sessions. As shown in FIG. 9, correspondence between the procedural world (information concealed world) 403 and the static world 410 and the dynamic world 420 is made by the extension 401 as shown in FIG. 9.

Furthermore, the connotation 402 is the information concealed world. The connotation 402 includes data which gives meaning (or significance) to the extension 401. The real world 400 is simulated by the extension 401 which includes this meaning (or significance). This simulation of the real world gives a static model corresponding to the static world 410 and a dynamic model corresponding to the dynamic world 420.

Figure 10:
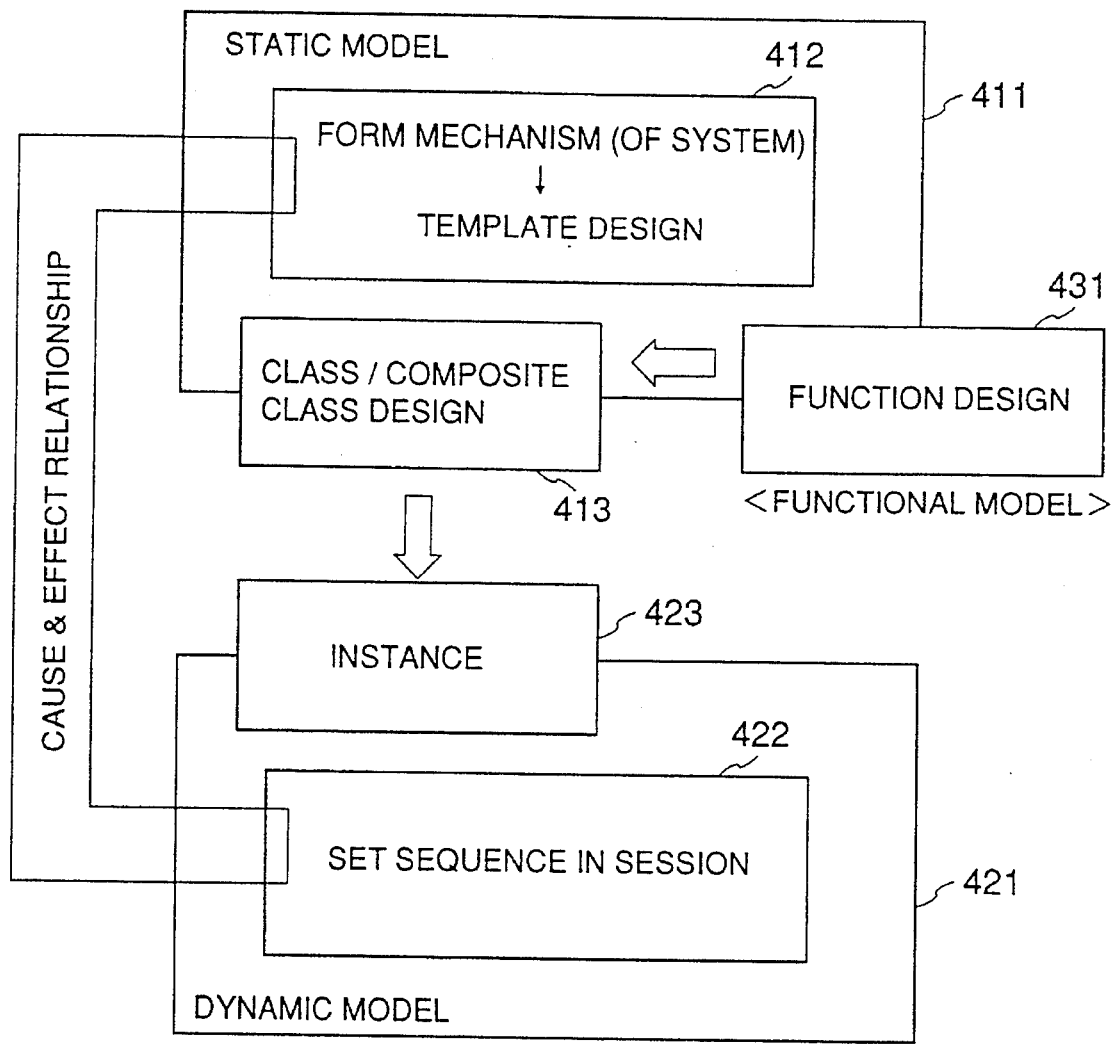
FIG. 10 is a diagram for explaining the relationships of a static model, a dynamic model and a functional model.

FIG. 10 is a diagram for explaining the relationships of the static model, the dynamic model and the functional model. A static model 411 shown in FIG. 10 is the same the static world 410 shown in FIG. 9, and a dynamic model 421 shown in FIG. 10 is the same as the dynamic world 420 shown in FIG. 9. In addition, a functional model 431 shown in FIG. 10 corresponds to the information concealed world 403 shown in FIG.

Figure 11:
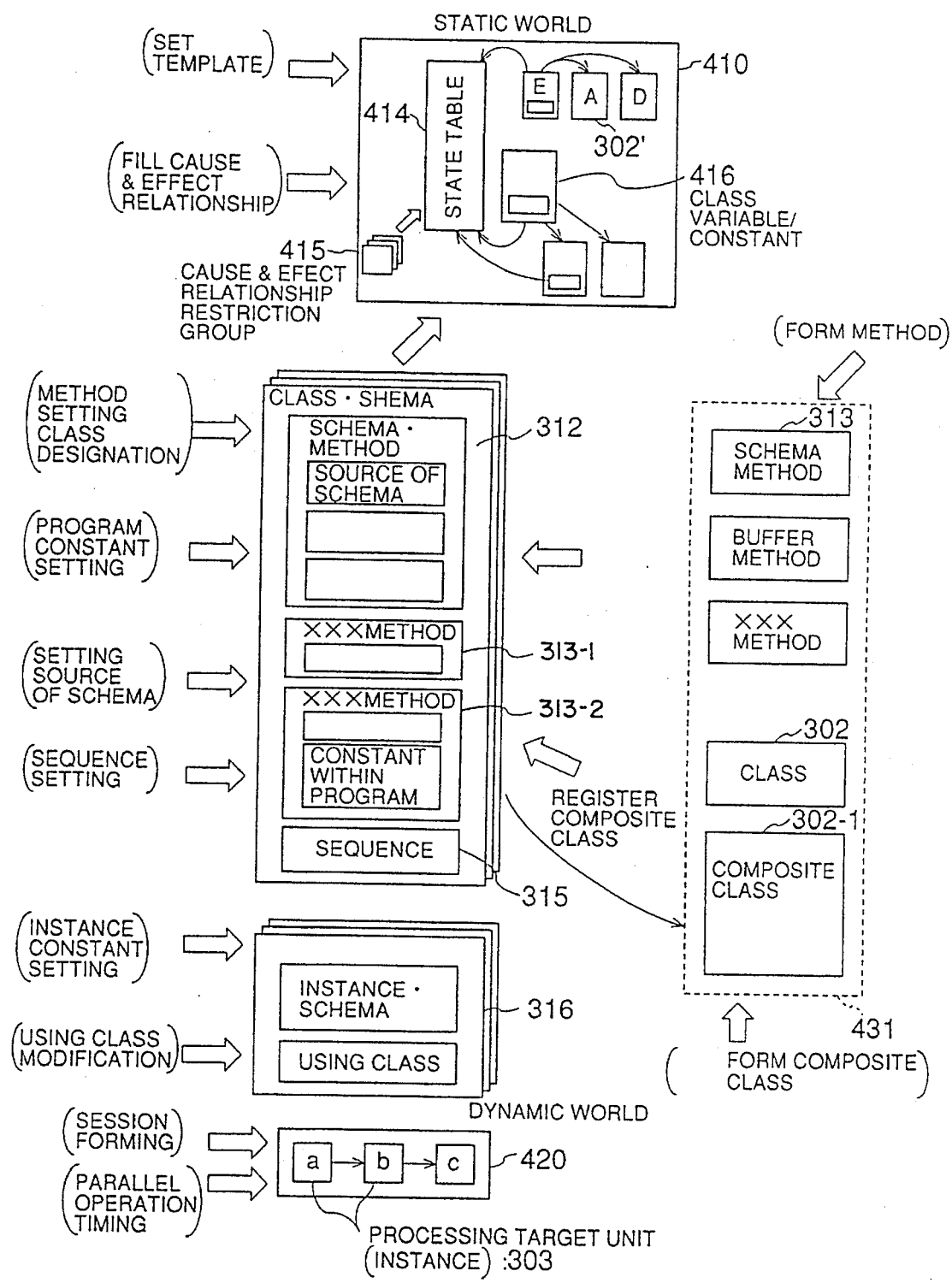
FIG. 11 is a diagram for explaining the relationship of FIGS. 8 and 10.

By specifying the construction of the system and designing the "is-a" and "part-of" relationships (templates) described above, it is possible to form the static model 411. Then, the functional design is obtained, and the class 302 or a composite class 302-1 show in FIG. 11 is designed in a corresponding manner. A plurality of classes are added or integrated to form the composite class 302-1.

The dynamic model 421 is formed by assigning instance data within the class 302 to form a specific target processing unit (instance), and designing the time sequential relationship of each of the target processing units. The restriction of the cause and effect relationship are given between the static model 411 and the dynamic model 421.

FIG. 11 is a diagram for explaining the relationship of FIGS. 8 and 10 by relating each other. Elements 312 through 316 shown in FIG. 11, respectively, correspond to the elements with the same reference numerals in FIG. 8. In addition, the static world 410 shown in FIG. 11 corresponds to the static model 411 shown in FIG. 10, and the dynamic world 420 shown in FIG. 11 corresponds to the dynamic model 421 shown in FIG. 10.

The composite class if formed by forming methods for carrying out the target data processing, forming the classes by combining a plurality of methods, and combining a plurality of classes depending on the need. The methods, classes and composite classes are placed in the information concealed world shown in FIG. 9.

When forming the class, a class name is specified and a method ID of a method which is introduced in a modifiable manner and used in the class in correspondence with the method setting is described within a class schema 312, as described later in conjunction with FIG. 12. In addition, a link is made between the method ID and each of the methods 313-1, 313-2, . . . 313-n. Further, the sequence with which each of the method are executed is set.

In addition, an instance schema 316 is formed in correspondence with a specific process. In other words, the class name of the class using the instance is described, and the individual instance data are described, within the instance schema 316.

In correspondence with the formation of the classes and the instance schema, the static world is formed such that the classes and methods which are chained under a certain state table 414, and variables and constants 416 corresponding to each of the methods exit. Moreover, the relationship is determined between other classes under the "is-a" relationship and the "part-of" relationship described above, depending on the needs. Furthermore, a restriction group which gives the cause the effect relationship is set.

In the dynamic world, the sessions are assembled and the processing sequence is specified. In addition, when carrying out parallel processing, the processing timing is specified.

Next, a description will be given of the mechanism for generating the classes and the instances.

Figure 12:
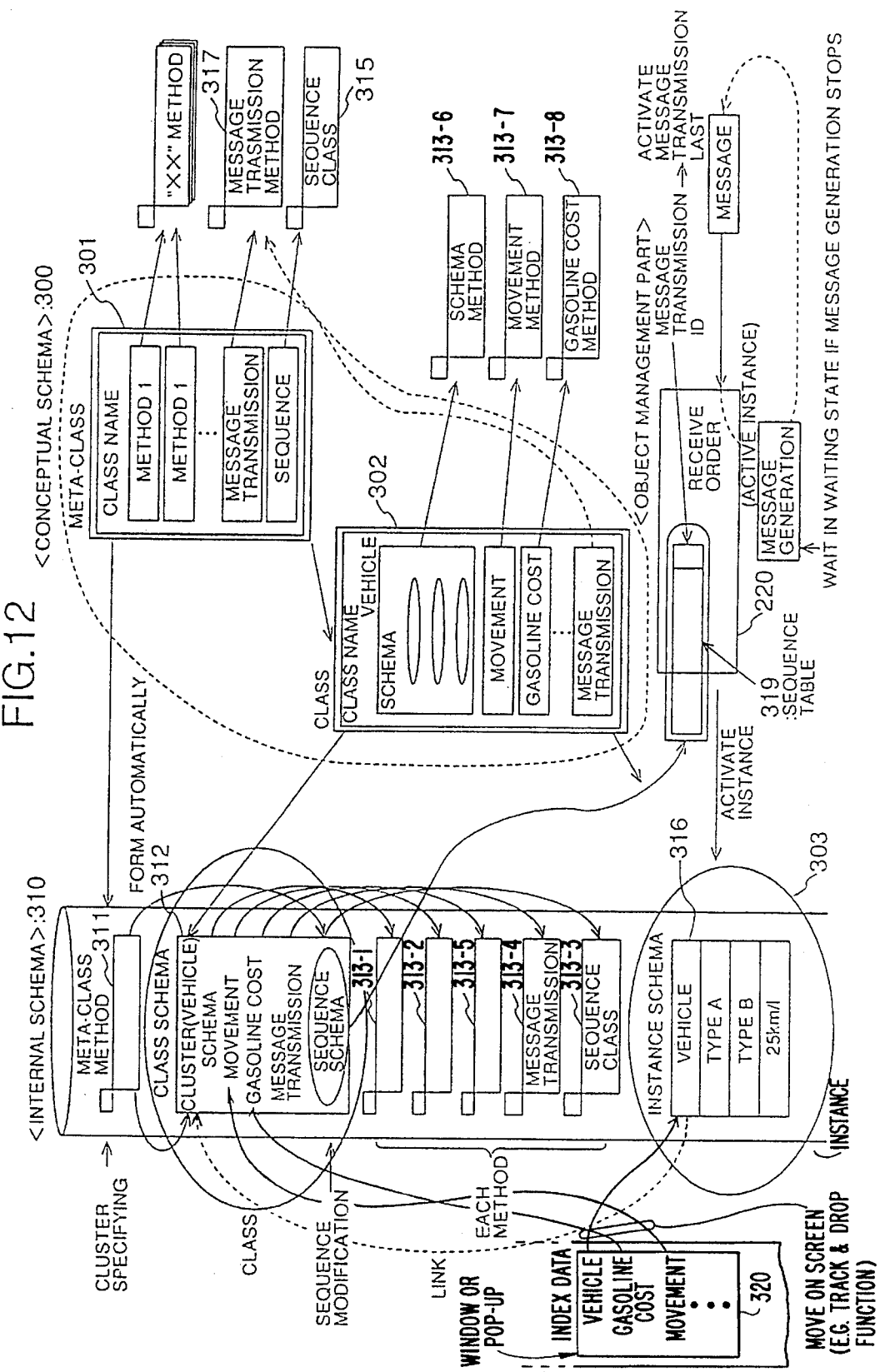
FIG. 12 is a diagram for explaining a state of generating a class from a meta-class.

FIG. 12 is a diagram for explaining a state where a class is generated from a meta-class. A conceptual schema 300 shown in FIG. 12 conceptually describes an information hierarchy relationship considered in the present invention. A meta-class 301 is prepared in the present invention so that it is possible to generate a class which appropriately introduces the methods in the modifiable manner.

In a class 302 is related to an automobile, for example, considerations are made so that various methods related to the automobile may be treated as one class by introducing the various methods in the modifiable manner. In this case, an instance 303 indicates a processing program which is made for a specific automobile by giving independent specific data to the general name data used by each of the methods introduced within the class 302 which is related to the automobile.

An internal schema 310 is constructed within the data processing apparatus in correspondence with the conceptual schema 300. A meta-class method 311 is a method for generating the desired individual class. A class schema 312 describes the method ID for the various methods introduced in the class in the modifiable manner, and describes the sequence schema specifying the sequence relationship and the like used by the various methods, in correspondence with a certain class which is generated.

Methods 313-1, 313-2, 313-3, . . . 313-n are linked to the method IDs of the class schema 312, and forms a class method group which is used in the class.

In an instance schema 316, there are described the class names of the classes (for example, the class 312) related to this instance schema 316, and the instance data (may be considered a the entity data 203) which are required by the methods used in these classes and are linked to each of the method IDs.

Index data 320 in the form of window or pop-us data are introduced within the instance schema 316 as instance data. Also shown in FIG. 12 are a message transmission method 317, a fuel cost calculation method 313-8, and a sequence table 319 provided within an object management part 220.

For example, generation of the class 302 related to the automobile and the instance 303 related to this class 302 is carried out as follows.

The operator wishing to generate the class 302 and the instance 303 thinks of various method, assuming that these various methods already exist, and these methods are considered as methods necessary to generate the class 302. The considered methods may be regarded as the meta-data 301.

The operator inputs to the meta-class method 311 information indicating that the class 302 related to the automobile is to be generated. In addition, the operator inputs to the meta-class method 311 the various methods thought of by the operator.

In correspondence with the above, the meta-class method 311 describe in the class schema 312 that the class relates to the automobile and describes the method ID corresponding to the various method names. At the same time, the meta-class method 311 automatically describes in the class schema 312 the sequence schema which indicates the using sequence for the various method used by the class, and the respective IDs of the message transmission methods which likely would be necessary when the class communicates with another.

In correspondence with the generation of the class schema 312, the respective methods 313-1, 313-2, . . . 313-n of each of the method ID are pointed, thereby generating the class. Of course, the methods which are used may be appropriately and freely deleted, changed and added with respect to the generated class. In addition, it may be regarded that the meta-class method 311 is started from the side of the class which is to be generated.

Furthermore, the class schema is activated from the class name (name of the related class) described in the instance schema 316, and the instance data used in the various methods used by the class are successively input and described in the instance schema 316. It may be regarded that in this operation, the operator is urged to input the instance data from the class side, and the operator inputs the instance data in response thereto. Out of the instance data, the data unregistered up to that point are automatically registered in the pop-up data 320.

The data in the instance schema 316 is linked to the method IDs in the class schema 312. Of course, the instance data in the instance schema 316 may be deleted, changed and added if necessary. In addition, when the method used by the class is modified, a corresponding change is made.

By the above-described construction, it becomes possible to generate the desired class, modify the methods used in the class, and modify the instance data, while using an appropriate combination of the methods.

The class name of the class to be made is set, and the method used by the class are designated, using the meta-class method 311. In accordance therewith, the message transmission method 317 for use when the class communicates with another and the like are automatically set, and the sequence relationship of each method used in the class is also set.

Furthermore, the method IDs of each of the introduced methods, the message transmission method ID, and the sequence schema are described in the class schema 312. Moreover, each ID and each method are linked.

By specifying the instance using the class formed as described above, a specific processing program is formed. In the case shown in FIG. 12, the instance schema 316 which introduces the specific instance is prepared in correspondence with the class "automobile".

When a message using a predetermined instance schema is given in the object management part 220, for example, the object management part 220 starts the instance (introduces the instance schema). In addition, the class schema 312 shown in FIG. 12 is linked from the class names described within the class schema 312 is introduced within the sequence table 319. After this process, the object management part 220 inspects the content of the sequence table 319 and successively uses the necessary methods, and in addition, processes the instance corresponding to the message using the content of the instance schema 316.

Figure 13:
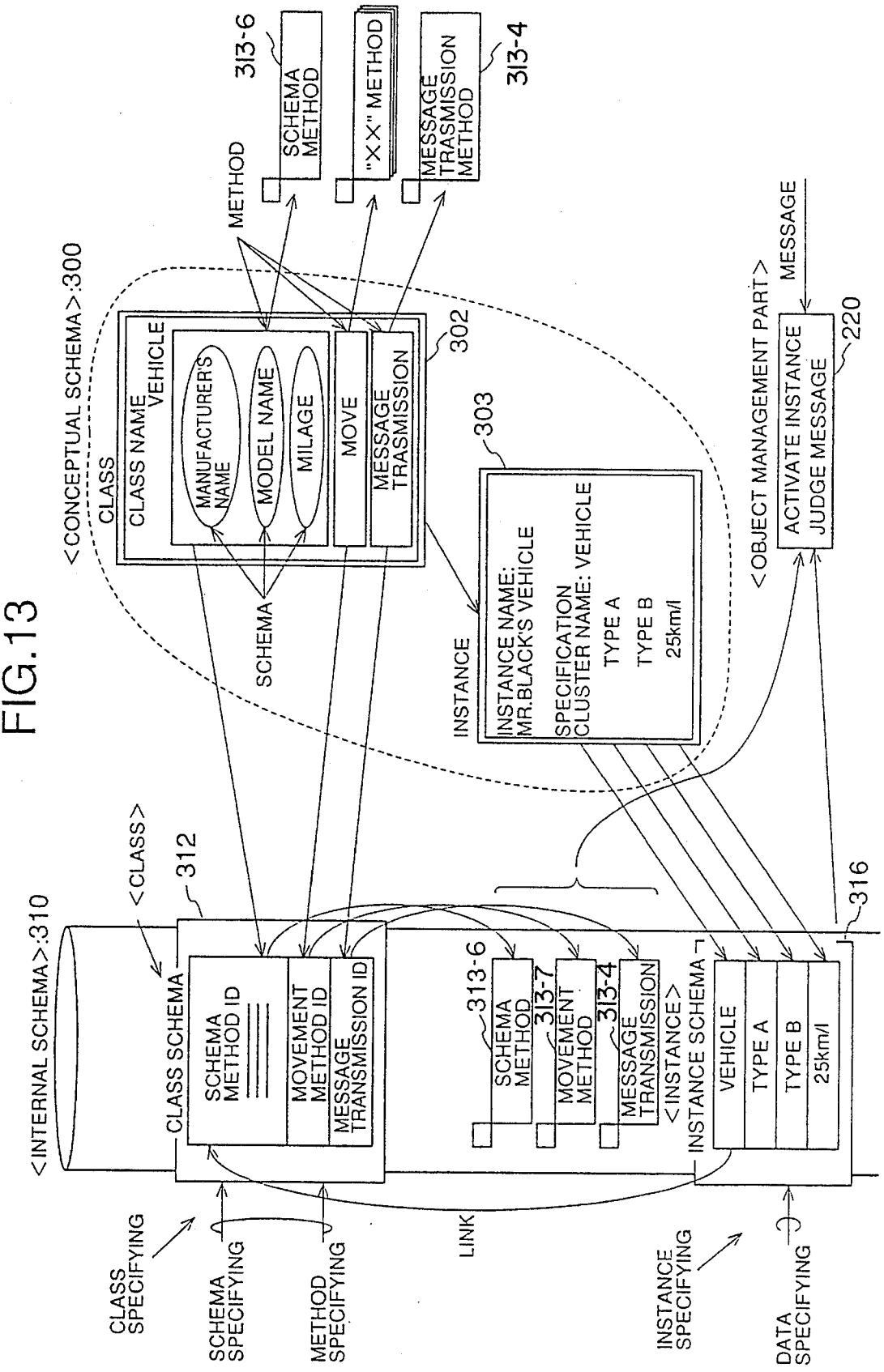
FIG. 13 is a diagram for explaining a state of generating a class from a meta-class.

FIG. 13 is a diagram for explaining the state of generating the instance from the class. In FIG. 13, those parts which are the same as those corresponding parts in FIG. 12 are designated by the same reference numerals, and a description thereof will be omitted.

When the method to be introduced in the class 302 is specified in correspondence with the class 302, the class schema 312 is formed and the methods 313-1, 313-2, . . . 313-n are linked within the internal schema 310.

The class which is formed in this manner, that is, the class related to "automobile", for example, may be regarded as being made up of a data storage region and a method group for carrying out various processes related to the automobile, where the data storage region is still empty and may be set with rewritable instance data. By setting a specific instance data in the data storage region of the class which is formed in this manner, the instance (a specific processing program using the instance data) is formed. This specific processing program is the instance shown in FIG. 13.

When forming the instance, the instance data used by each method are set in the instance schema 316. The content of the set instance schema 316 is linked to the method ID in the class schema 312. As a result, the methods in the corresponding classes are executed using the content of the instance schema 316. Hence, it becomes possible to execute the specific processing program (instance). The specific processing program (instance) is executed when the object management part 220 activates the instance schema 316 and the methods 313-1, 313-2, . . . 313-n.

As described above, the meta-class method 311 is used to input the class name of the class which is to be formed and to introduce the various methods in the modifiable manner into the class, so as to appropriately form the class in the desired form. In other words, the desired class is formed by appropriately combining the methods. In the case of the example of the processing program, the class may be regarded as a processing program in a state where the instance data are still described in the form of variables.

In the processing program in the state where the class, that is, the instance data, are still described in the form of variables, a processing program which is completed by specifying specific instance data in correspondence with the variables is the program which carries out the specific process. The processing program in which the variables are essentially set as constants is the above-described instance. By rewritably setting the instance data in the instance schema 316, the desired instance is appropriately formed.

Figure 14:
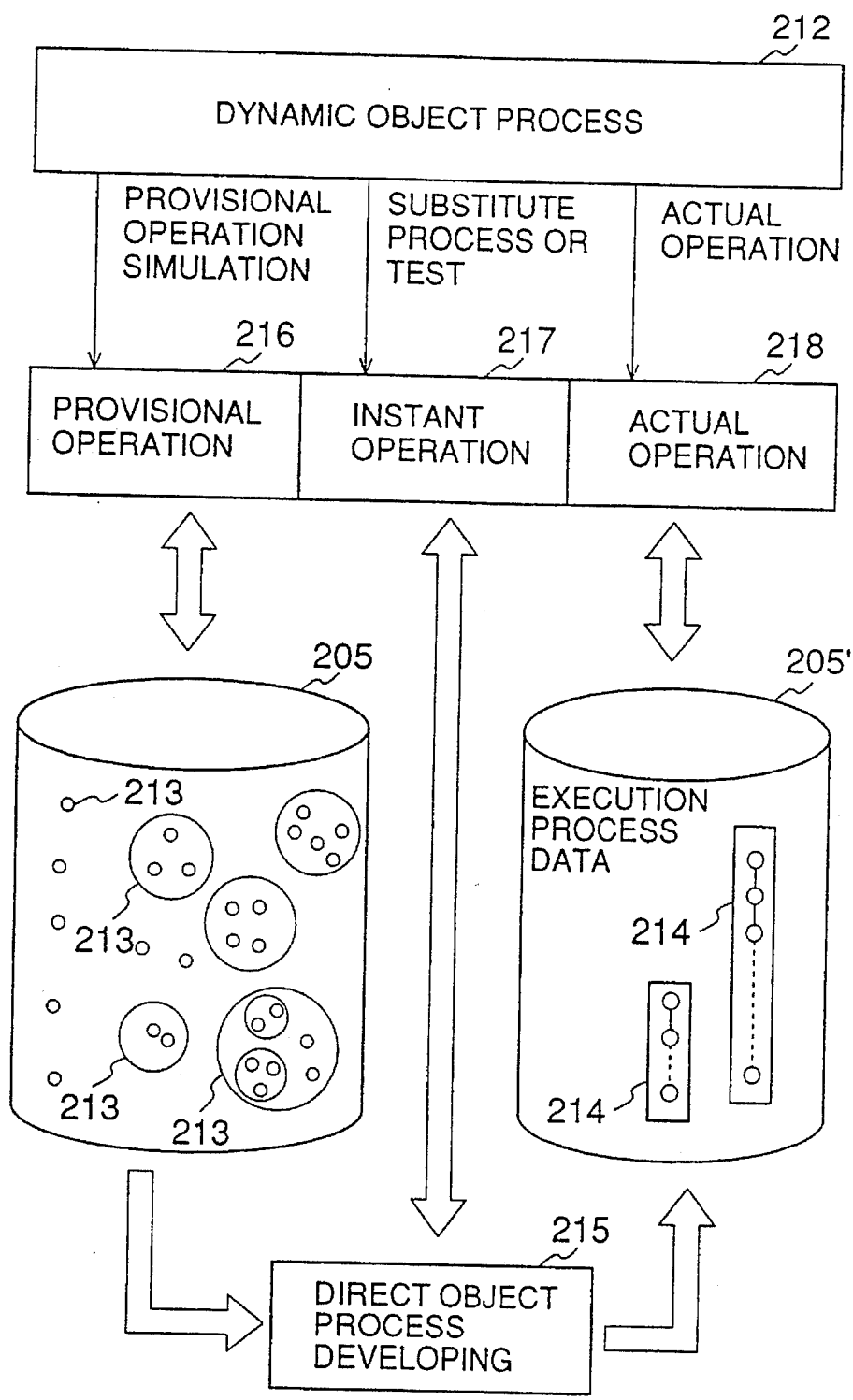
FIG. 14 is a diagram for explaining a portion of the operation of a dynamic object processor.

FIG. 14 is a diagram for explaining a portion of the operation of a dynamic object processor.

Figure 7:
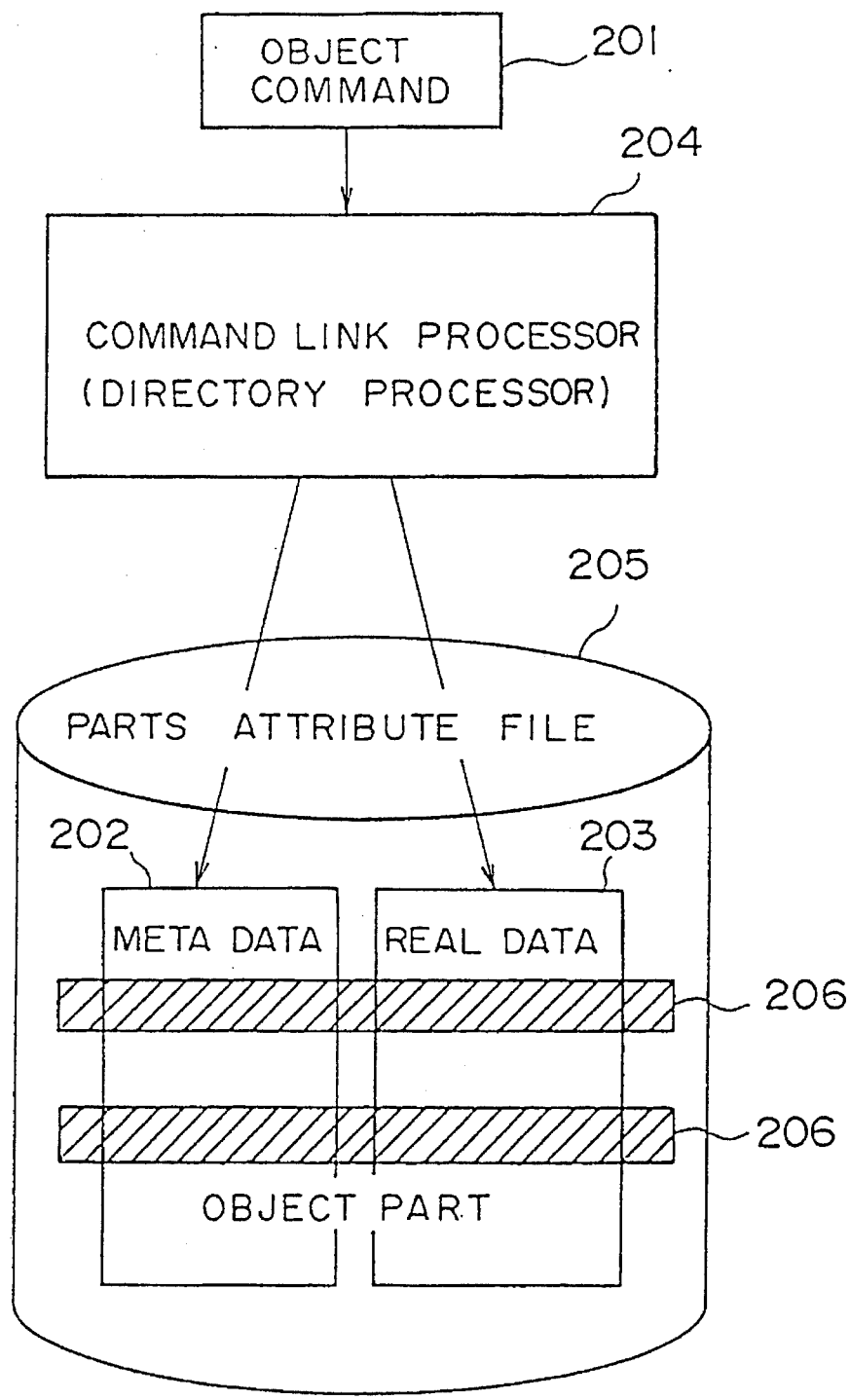
FIG. 7 is a diagram for explaining a process of treating the object.

The various information related to the internal schema 310 are held in a parts attribute file 205 as an object part 206 shown in FIG. 7. A dynamic object process part 212 shown in FIG. 14 carries out a process using this object part 206. Of course, it is possible to appropriately combine the object parts 206 or composite object parts which are combinations of the object parts 206.

The dynamic object process part 212 shown in FIG. 14 has a provisional operation mode 216 for carrying a simulation or the like, an instant operation mode 217 for carrying out a test or the like, and an actual operation mode 218 for carrying out a data processing or a communication process with another terminal.

The parts attribute file 205 is the same as that shown in FIG. 7. A file 205' holds execution process data 214 which is obtained by compiling all or a portion of the content of the parts attribute file 205 so as to enable high-speed execution.

In the case of an object program for process execution, the execution process data 214 in general are processing units which are made up of several tens to several hundred steps and serially connected in the processing sequence.

The objects 213 are shown within the parts attribute file 205. Generally, the object 213 may correspond to the form of the primitive object as it is, the state of the capsule object, the state of the event object or the state of the system object. As described above in conjunction with FIG. 7, it may be regarded that the objects 213 are stored in the form of object parts 206 and can be specified by the object commands.

A direct object process developing process 215 carries out a process of obtaining the execution process data 214 by developing the individual objects 213 or, developing a plurality of objects 213 as a whole.

Figure 1A:
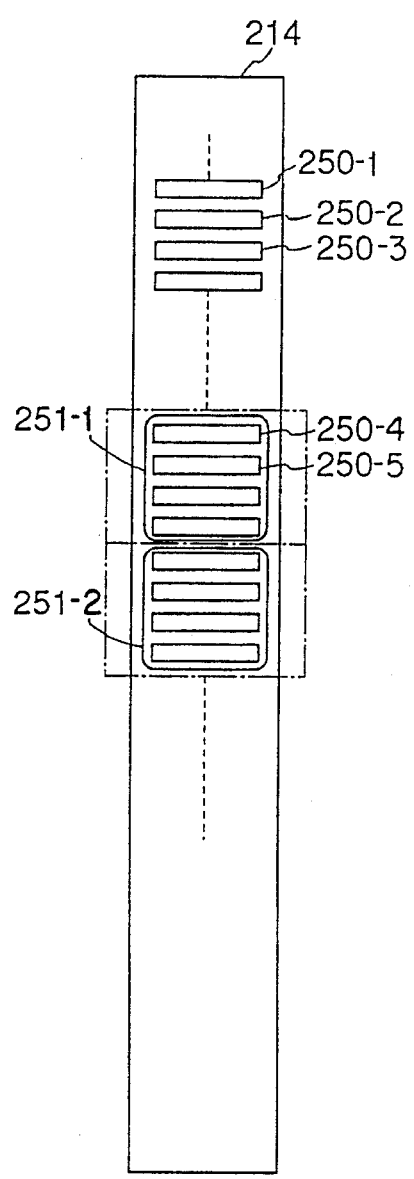
FIGS. 1A, 1B and 1C, respectively, are diagrams for explaining the formation of a capsule from objects.
Figure 1B:
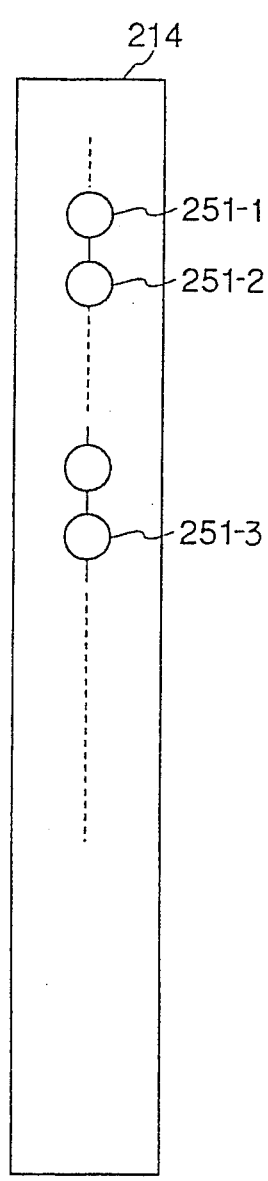
Figure 1C:
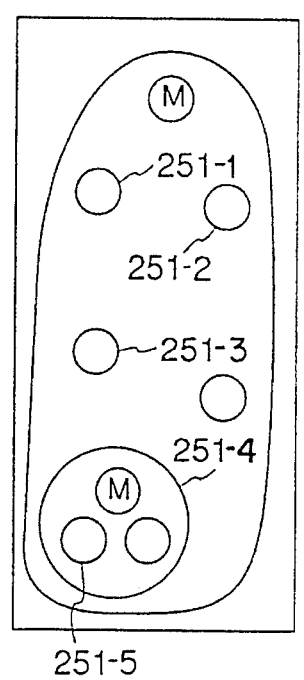
Figure 2:
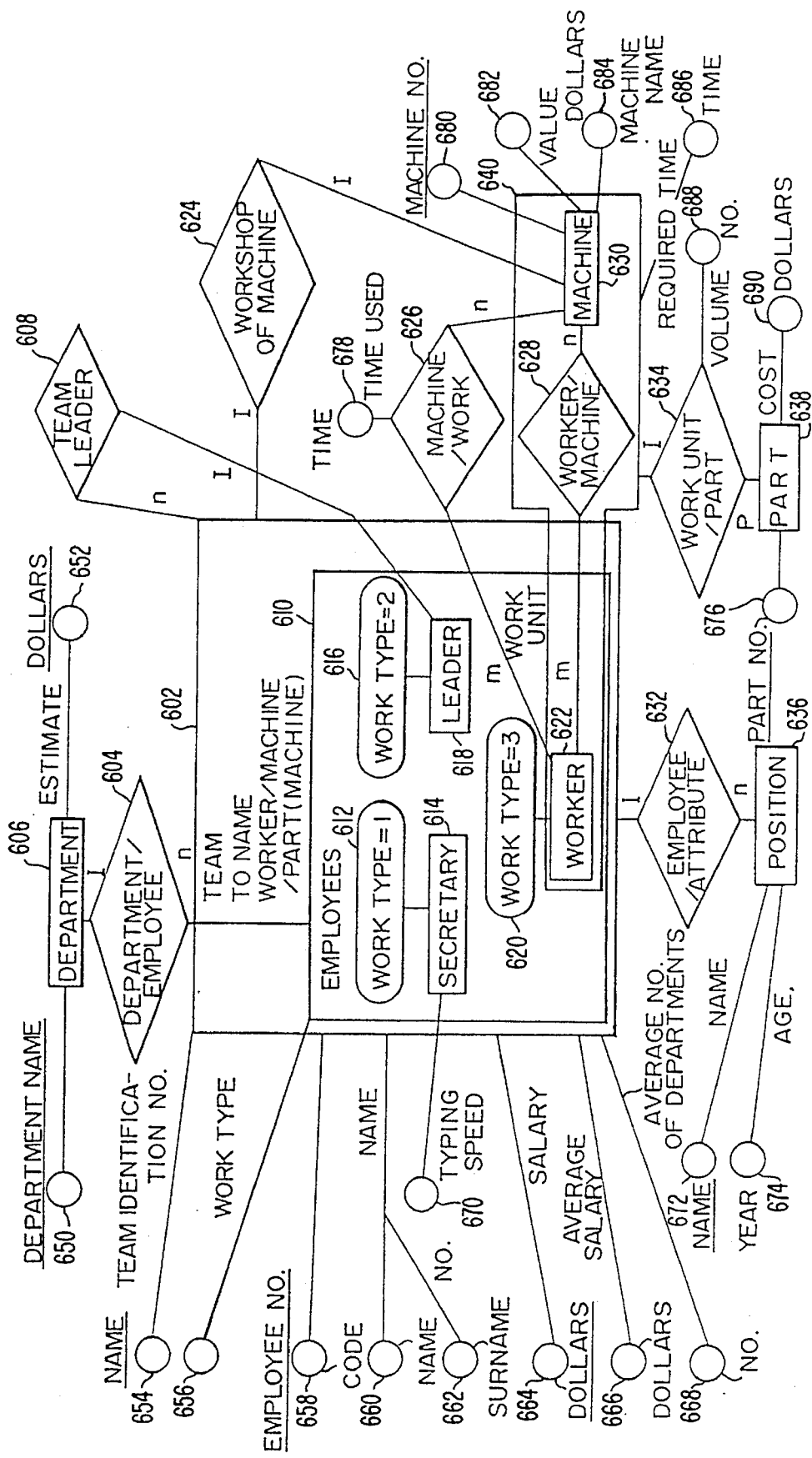
FIG. 2 is a diagram for explaining model forming for departments of a company.
Figure 3:
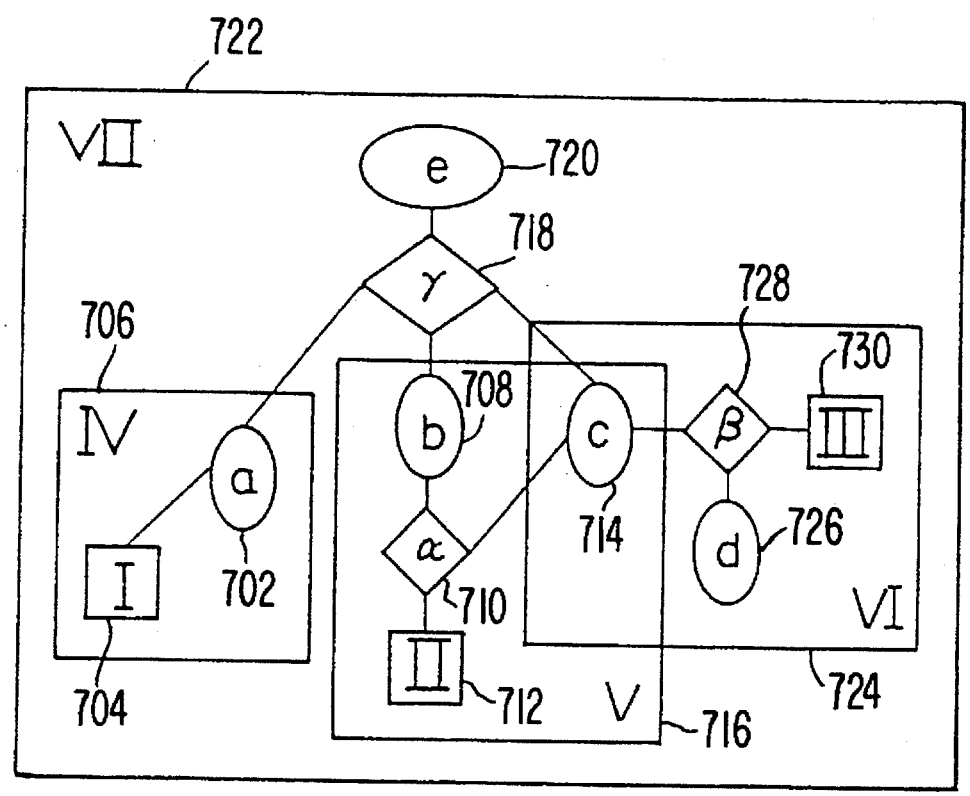
FIG. 3 is a diagram showing FIG. 5 in an abstract form.

As described above with reference to FIG. 1, the objects are generally combined into target processing units in the form of the composite object, and become a unit for exhibiting a behavior for executing a process having a certain object. Such composite objects are stored in the parts attribute file 205 in the form of object parts 206 which are specified by the object commands 201.

When generating a new processing function, a new object is generated or the existing objects are connected depending on the target, and the object which exhibits the new processing function is prepared as one of the object parts 206, in order to enable the new processing function.

A simulation is carried out with respect to the generated object so as to determine whether a correct function is actually obtained, or a provisional operation is carried out with respect to the generated objects for which the simulation is ended. Such a process corresponds to the provisional operation mode 216 shown in FIG. 14. The dynamic object process part 212 uses the content of the parts attribute file 205 to simulate the corresponding processing operation.

Figure 15:
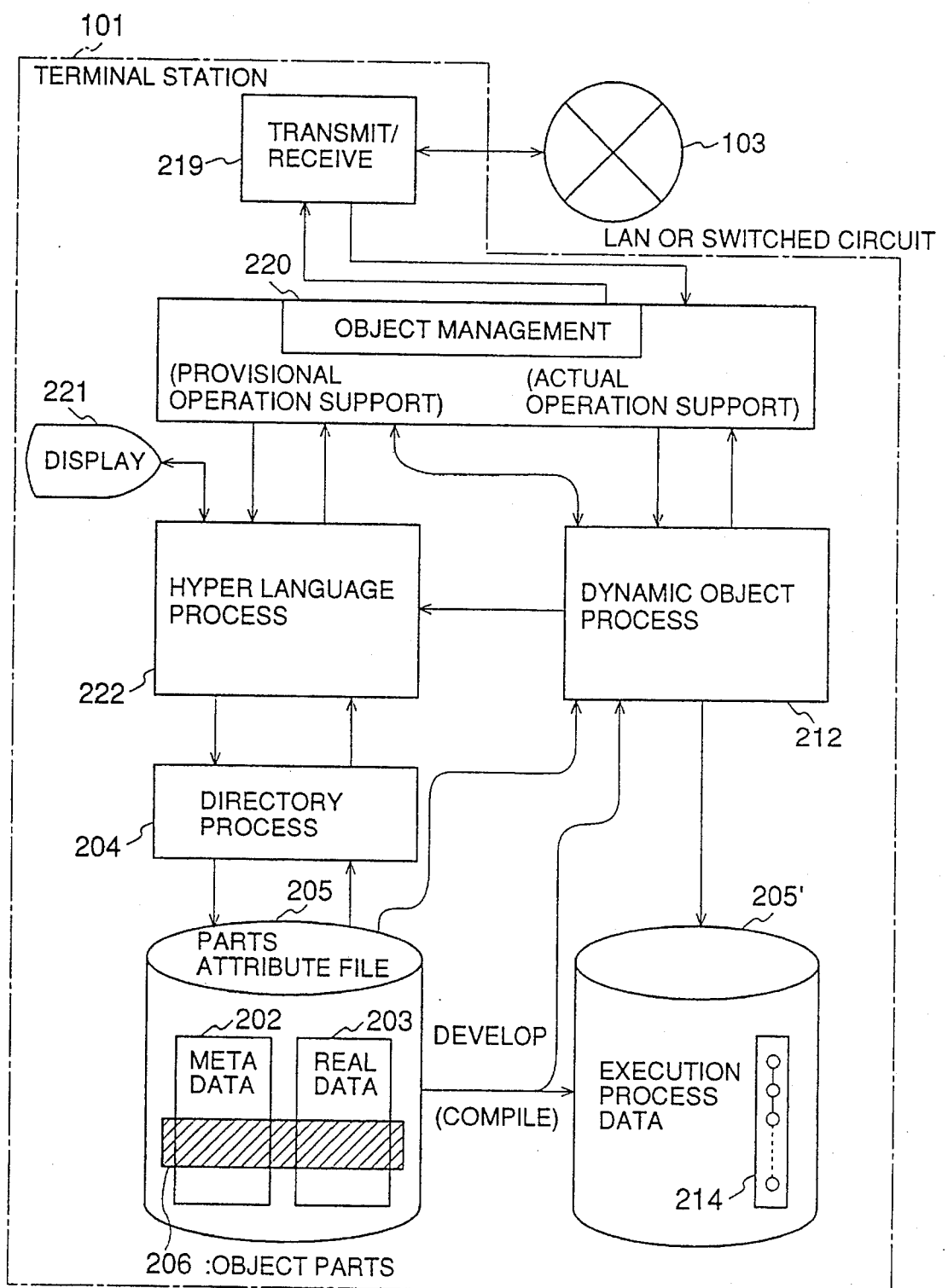
FIG. 15 is a system block diagram showing the construction of a terminal station.

The object 213 or the object group which operates normally in the provisional operation mode 216 is developed into the execution process data 214, that is, compiled into one execution process data 214, because the object 213 or the object group as it is requires a large number of communications with the object management part 220 shown in FIG. 15 and the processing speed is slow. This developing process is carried out in the direct object process developing process 215 and is stored in the parts attribute file 205'.

The dynamic object process part 212 uses the content of the parts attribute file 205 and temporarily carries out a substitute process with respect to a predetermined process. On the other hand, if it becomes necessary to carry out a test process, the dynamic object process part 212 activates the direct object process developing process 215 to generate the execution process data 214 and carries out this process. In FIG. 14, such a process mode is indicated as the instant operation mode 217.

The actual operation mode 218 shown in FIG. 14 is a mode for actually carrying out the process using the execution process data 214 shown.

The semantic (meaning or significance) data related to the nature of the object is described in the meta-data within the parts attribute file 205. In addition, it may be regarded that the coupling relationship of a certain object with respect to the object in the upper layer (object indicated by the "is-a" relationship; the coupling relationship of the certain object with respect to the object group in the lower layer and included in the certain object (group of objects indicated by the "part-of" relationship); and the like are also described in the meta-data within the parts attribute file 205. The layer indicates the layer of a hierarchy relationship.

FIG. 15 shows the construction of a terminal station 101. In FIG. 15, the elements 202, 203, 204, 205, 205', 206, 212 and 214, respectively, correspond to those elements with the same reference numerals in FIGS. 7 and 14. In addition, a terminal station 101 shown in FIG. 15 executes the process using the execution process data 214, and communicates with another terminal station via a line 103. The line 103 is a line of a local area network (LAN), a switched circuit or the like.

A communication/reception process part 219, the object management part 220, a display 221, a hyper language process part 222 and the like exist within the terminal station 101.

The process of the directory process part 204 shown in FIG. 15 is the process described above in conjunction with FIG. 7. On the other hand, the process of the dynamic object part 212 is the process described above in conjunction with FIG. 14.

In FIG. 15, a "provisional operation support" is a support function corresponding to the operation that is carried out until the provisional operation mode 216 shown in FIG. 14 is carried out.

The hyper language process part 222 shown in FIG. 15 has a "parts display/selection" function, and retrieves the usable object parts from the display 221 and outputs the same. If no appropriate object part exists, the hyper language process part 222 uses a "parts specify" function to specify a part as a new object part. The hyper language process part 222 can also generate a class object part by an "attribute set" function, and generate an instance object part by a "schema" function.

The "parts display" function using the display 221 includes (i) content display of names and comments of meta-data of the object parts, (ii) display of schema and attribute indicating the content of the object parts, and (iii) display of class attributes and instance constants.

A "parts combine" function of the hyper language process part 222 combines the object parts to obtain a larger composite object part. For this "parts combine" function, a function of adding, modifying and deleting the attribute related to the formation of the classes is provided. Additionally, a function of adding, modifying and deleting the schema related to the formation of the instance constants is provided.

A "user screen form" function of the hyper language process part 222 forms the instance by inputting screen data in the buffer of the "screen form and display" class when making the screen forming and display. For this reason, the "user screen form" function corresponds to forming the screen class into the form of the instance.

Figure 4A:
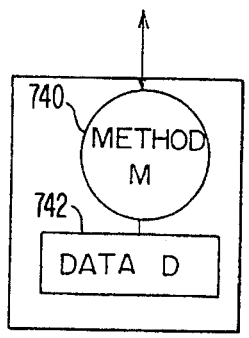
FIGS. 4A, 4B and 4C, respectively, are diagrams for explaining the capsule.
Figure 4B:
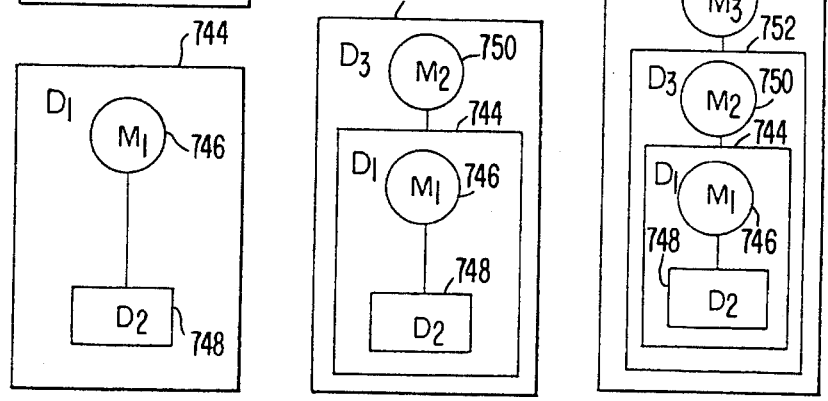
Figure 4C:
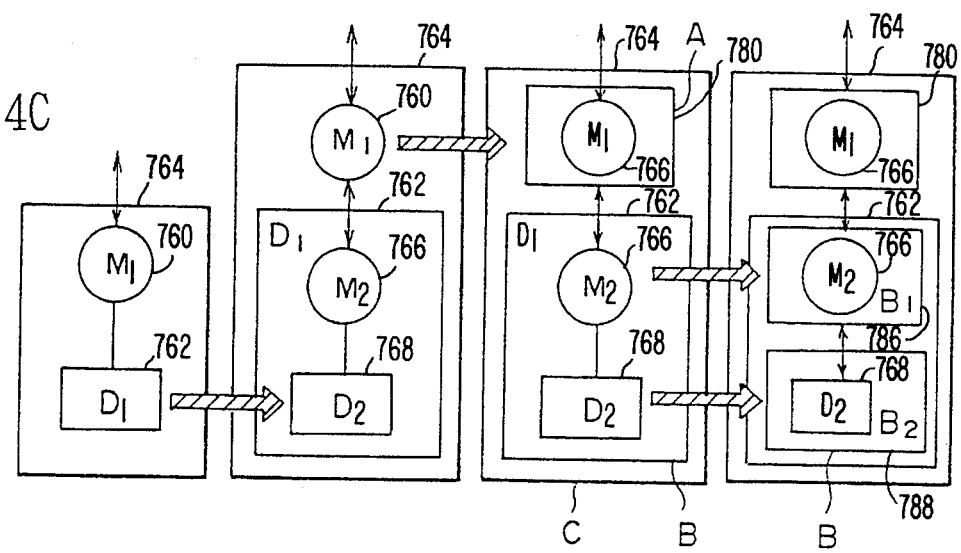

A "provisional operation" function of the hyper language process part 222 links the message to the method indicated by the class when the instance receives the message. Hence, the capsule shown in FIG. 4C is temporarily realized in a primary memory, and the behavior of the capsule is executed.

Furthermore, a "parts modify" function of the hyper language process part 222 is a function of modifying the object parts by modifying, adding and deleting the attribute and schema. In addition, a "parts register" function is a function of registering the object parts in the parts attribute file 205 by making the object parts correspond to the object commands which are the names of the object parts.

The "develop (compile)" shown in FIG. 15 indicates the direct object process developing process 215 shown in FIG.

14. The developing process makes a developing into a largest possible execution process data 214 depending on the side of the primary memory of the data processing apparatus.

The object management part 220 controls the hyper language process part 222 shown in FIG. 15 to hold the object parts 206 in the parts attribute file 205, and controls the dynamic object process part 212 to carry out the provisional operation mode 216, the instant operation mode 217 and the actual operation mode 218 shown in FIG. 14. In addition, the instance is activated in the provisional operation mode 216 in correspondence with the message reception via the line 103, and a capsule is provisionally formed in the primary memory to operate the data processing apparatus and to make a message transmission related to the result of the processing.

When carrying out the process within the terminal station 101, if the desired object part does not exist within the terminal station 101 or the attribute or schema does not exist, a data transfer is received from another terminal station via the line 103 to introduce the data within the terminal station 101 and carry out a learning process.

Figure 16:
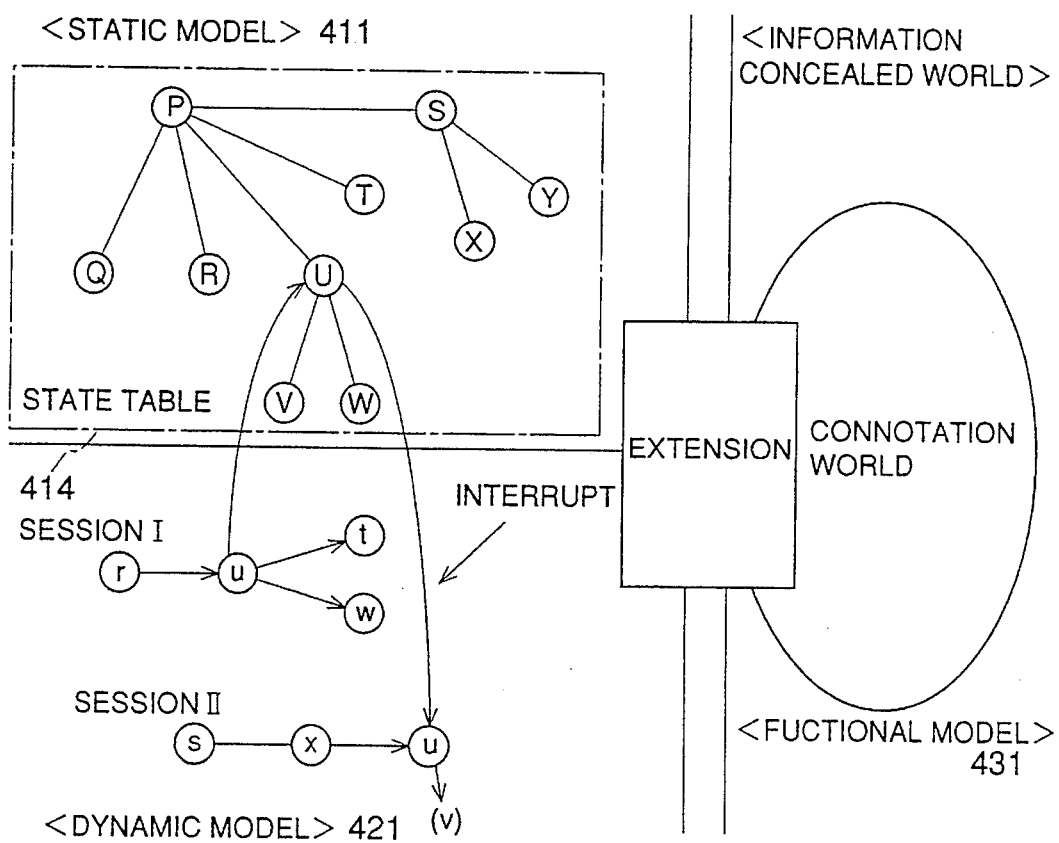
FIG. 16 is a diagram for explaining the introduction of the cause and effect relationship when executing a session.

FIG. 16 is a diagram for explaining the introduction of the cause and effect relationship when executing a session. In FIG. 16, elements 411, 421 and 431, respectively, correspond to the same reference numerals in FIG. 10. In addition, an element 414 in FIG. 16 indicates the same state table as that shown in FIG. 11.

In the case shown in FIG. 16, it is indicated that classes P through Y are introduced as the information within the state table 414 for a certain process. The classes Q, R, S, T and U exist under the class P, the classes X and Y exist under the class S, and the classes V and W exist under the class U. In addition, instances r, u, t, w, s and x are generated and the session is assembled.

A session I and a session II are executed under the dynamic model 421. However, during the time when the individual instances such as the instance u carries out its own process, it is unnecessary to take into consideration the cause and effect relationships with the other instances. For example, the content of the state table 414 is inspected at the time when the instance u starts its own process, and the process is executed after checking whether no violation is made with respect to the restrictions of the cause and effect relationship. If is sufficient to report the cause and effect relationship to the state table 414 at the time when the process of the instance u is ended.

In a case where, as a result of executing the instance u in the session I, it becomes necessary to execute another instance v instead of executing the instance u in the session II, a branch is made to the instance v by making an interrupt to the instance u of the session II based on the execution end report of the instance u of the session I. Alternatively, the dynamic model 421 is notified of the above when starting the instance u of the session II.

Figure 17:
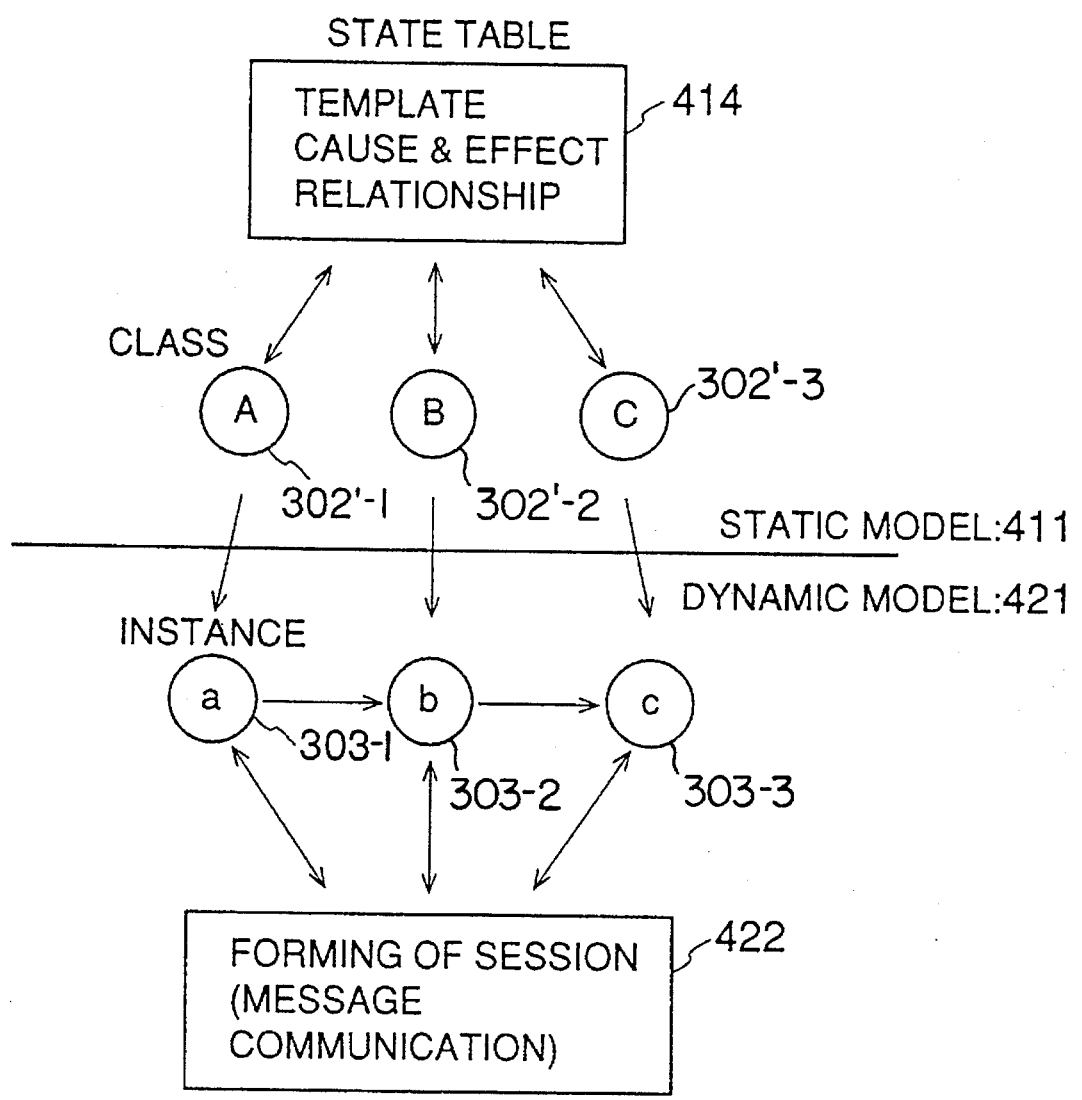
FIG. 17 is a diagram for explaining the relationship of the existence of the class and the process execution by the instance.

FIG. 17 is a diagram for explaining the relationship of the existence of the class and the process execution by the instance. In FIG. 17, those elements which are the same as those corresponding elements in FIGS. 10 and 16 are designated by the same reference numerals.

As described above, the template and the cause and effect relationship are described in the state table 414 for the group of classes 302'-n. In the case shown in FIG. 17, the instances a, b and c are generated in correspondence with the classes A, B and C which are introduced as the classes 302'-n. The instance b 303-2 is activated by the message communication in the correspondence with the end of the process of the instance a 303-1, and the instance c 303-3 is activated by the message communication in correspondence with the end of the process of the instance b 303-2. When forming the session which is a combination of these instances, the instruction is given by the operator as shown on the lower portion of FIG. 11 as "(session forming)" and "(parallel operation timing)", and the results are described within the dynamic model and used when executing the session.

Figure 18A:
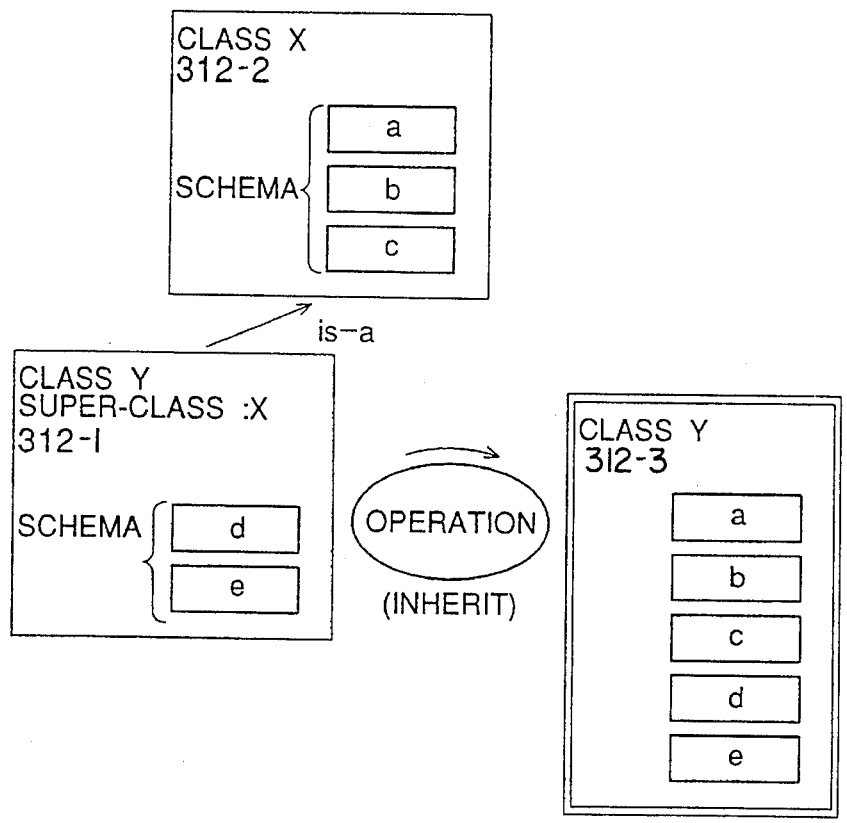
FIGS. 18A and 18B, respectively, are diagrams for explaining the relationship among a plurality of classes.
Figure 18B:
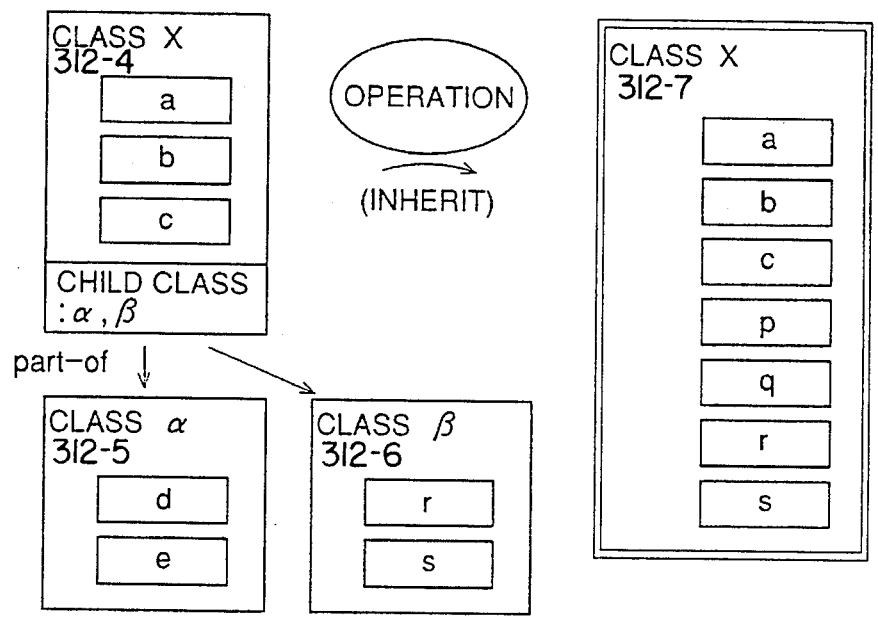

FIGS. 18A and 18B are diagrams for explaining the relationships among a plurality of classes.

FIG. 18A shows a case where a class Y 312-1 has the "is-a" relationship to a class X 312-2. For example, the class X is a program related to "vehicle", and the class Y is a program related to "automobile".

In the case shown in FIG. 18A, methods a, b and c are introduced in relation to the class X, and methods d and e are introduced in relation to the class Y. In such a case, when an instruction specifies execution of the class Y 312-1, the methods a, b and c are inherited from the class X 312-2 when executing the class Y 312-1, thereby executing a process based on the methods a, b, c, d and e.

FIG. 18B shows a case where classes a 312-5 and β 312-6 have a "part-of" relationship with respect to the class X 312-4. For example, the class X 312-4 is a program related to "vehicle", and the classes a 312-5 and β 312-6, respectively, are programs related to one of "chassis", "engine", "wheel" and the like.

In the case shown in FIG. 18B, methods a, b and c are introduced in relation to the class X 312-4, methods p and q are introduced in relation to the class a 312-5, and methods r and s are introduced in relation to the class β 312-6. In such a case, when an instruction specifies execution of the class X, a process is executed based on the methods a, b, c, p, q, r and s when executing the class X 312-7.

Although the "is-a" relationship and the "part-of" relationship are shown as examples of the template, the template is, of course, not limited to such.

Figure 19:
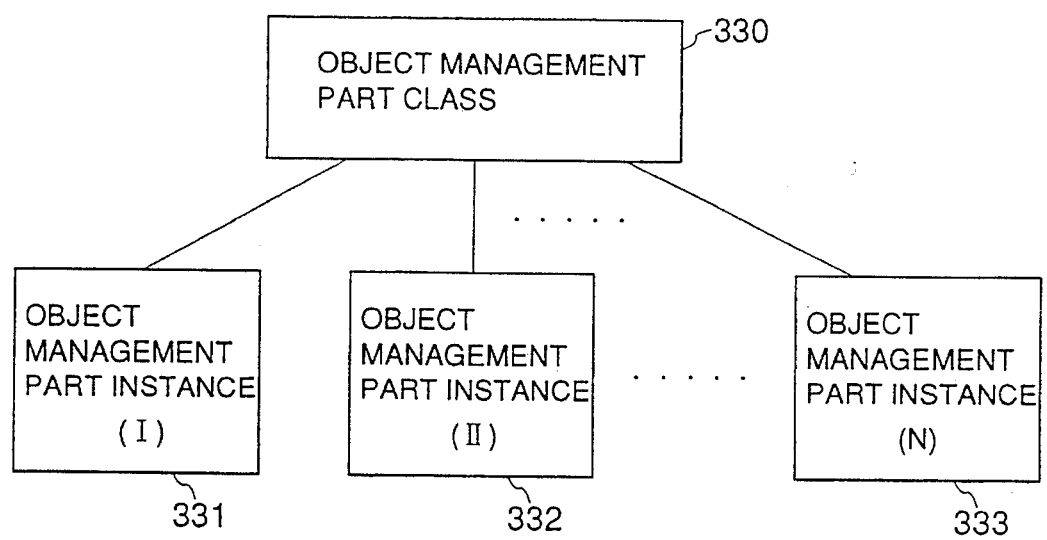
FIG. 19 is a diagram for explaining the structure of an object management part.

FIG. 19 is a diagram for explaining the construction of the object management part 220. The object management part 220 shown in FIG. 19 corresponds to that shown in FIGS. 12, 13 and 15, and executes a process using various information existing within the parts attribute file 205.

As described above in conjunction with FIGS. 12 and 13, the object management part 220 executes a process in correspondence with the messages, and thus, it must be possible to execute a plurality of messages in parallel. For this reason, an object management part class 330 is prepared, and it is made possible to generate a plurality of object management part instances 331, 332, . . . , 333 in correspondence with the reception of the messages. One object management part instance is assigned in correspondence with the reception of each message, and a plurality of messages are processed in parallel by processing a plurality of object management part instances in parallel. Of course, if the messages are concentrated within a short time period, a wait queue is formed in correspondence with each of the object management part instances such as the object management part instance 331.

Figure 20:
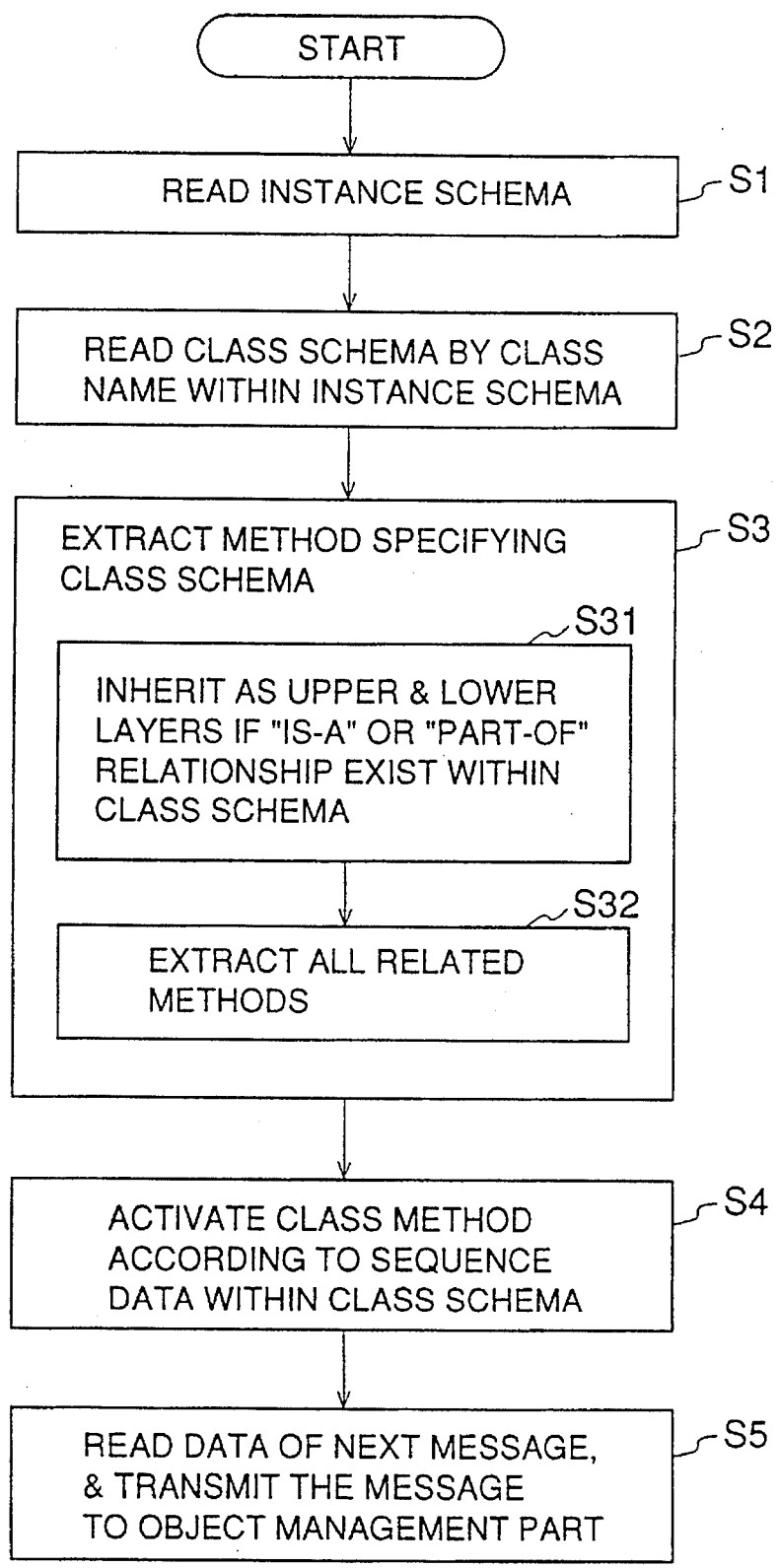
FIG. 20 is a flow chart for explaining the operation of the object management part.

FIG. 20 is a flow chart for explaining the operation of the object management part 220.

In FIG. 20, a step S1 reads the instance schema 316 in correspondence with the instance which is required when executing the message in correspondence with the message. A step S2 reads a class schema 312 by the class name described within the instance schema 316. In addition, a step S3 extracts the method specified by the class schema 312 based on the content of the class schema 312.

As a result, the required method is extracted. If upper or lower classes which are in the "is-a" or "part-of" relationship exist within the class schema 312, such classes are obtained.

This means that the methods of the related classes are inherited as described above in conjunction with FIGS. 18A and 18B. In other words, a step S31 obtains the class having the "is-a" or "part-of" relationship, and a step S32 extracts all of the related methods.

A class S4 successively activates the methods introduced into the class according to the sequence data described within the class schema 312. A step S5 executes a process for the next message when the above-described process corresponding to one message ends.

Figure 21:
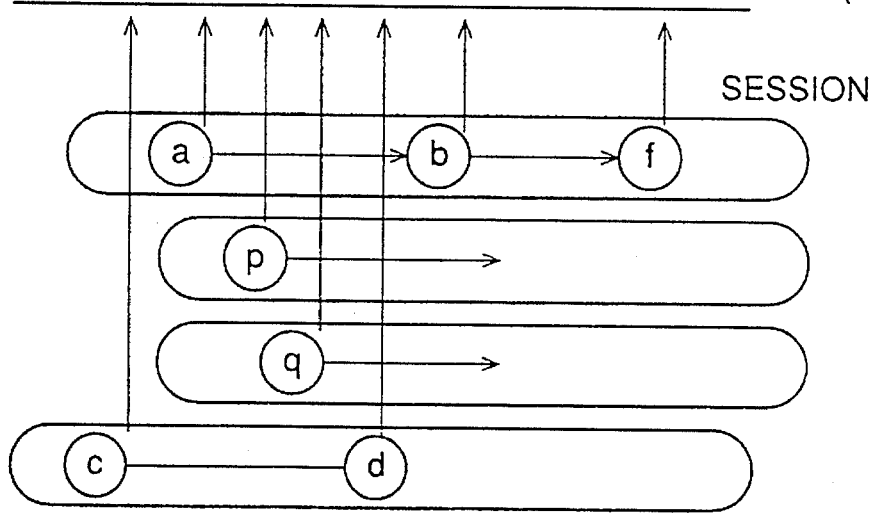
FIG. 21 is a diagram for explaining the checking of the cause and effect relationship when executing the session.

FIG. 21 is a diagram for explaining checking of the cause and effect relationship when executing the session. FIG. 21 shows a static model 411, a cause and effect relationship restriction group 415, and a accept method 417. In addition, Classes A, B, P, Q, C, D and E indicated by the capital letters, respectively, correspond to the classes 302'-n, and instances a, b, f, p, q, c and d 303-n indicated by the small letters, respectively, correspond to the instances which are obtained using the corresponding classes.

In the case shown in FIG. 21, it is assumed that the following restrictions exist within the cause and effect relationship restriction group 415.

(a) The class A receives a restriction within the own class A. A restricting condition $C_0$ is described as A=(blank).

(b) The class P or class Q may start on the condition that the process of the class A ended. A restricting condition $C_1$ is described as A→P, Q.

(c) The class B may be started on the condition that the processes of both the classes P and Q ended. A restricting condition $C_2$ is described as (P, Q)→B.

(d) The class A may start on the condition that the class C, class D or class E ended. A restricting condition $C_3$ is described as C, D, E→A.

When the above-described restricting conditions $C_0$, $C_1$, $C_2$ and $C_3$ are given, the restricting conditions $C_0$ through $C_3$ are checked via the accept method 417 at the time of starting the instance a, when executing the session in the dynamic model 421. In this case, the conditions $C_0$ and $C_3$ are satisfied and the processes are started. At a time $t_2$, when the process of the instance a ends, the state table is notified of this end via the accept method 417.

Next, when the processes of the instances p and q are started, a check is made to determine whether the restricting condition $C_1$ is satisfied. In addition, when starting the instance b, a check is made to determine whether the restricting condition $C_2$ is satisfied.

Figure 22A:
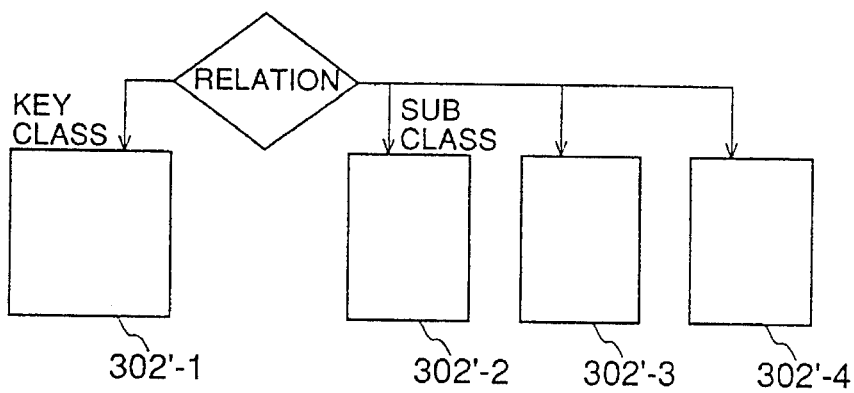
FIGS. 22A, 22B and 22C, respectively, are diagrams for explaining the lateral relationships among the classes.
Figure 22B:
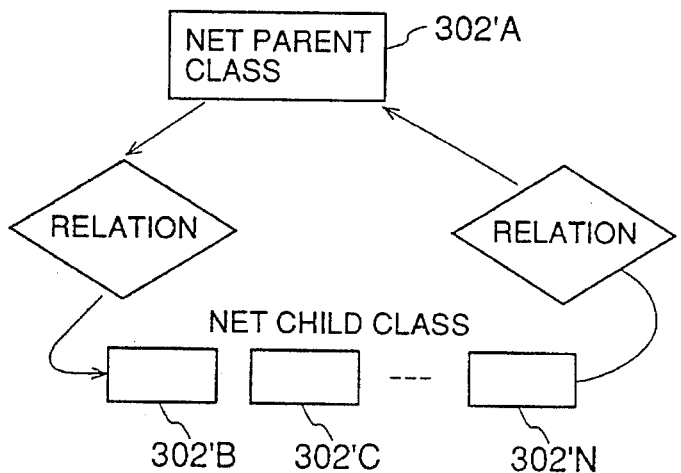
Figure 22C:
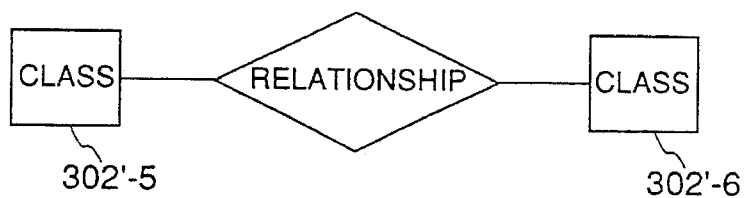

FIGS. 22A, 22B and 22C are diagrams for explaining the lateral relationships among the classes. FIG. 22A shows a case where a relational link exists, FIG. 22B shows a case where a network link exists, and FIG. 22C shows a case where a twin link exists. In FIGS. 22A, 22B and 22C, the classes are denoted by reference numerals 302'-1, 302'-2, . . . 302'A, 302'B, . . .

In the case of the relationship among the classes described above in conjunction with FIGS. 18A and 18B, the relationship between the upper and lower layers exists in both cases where the "is-a" relationship exists and the "part-of" relationship exists.

On the other hand, between two classes or among two or more classes, the mutual relationship may be of the same layer. In other words, instead of the relationship between the upper and lower layers, the classes in the same level may have a lateral relationship. Among the classes having such a lateral relationship, it is desirable in some cases to use the information described in only one class for another class if necessary. FIGS. 22A through 22C show typical examples of such lateral relationships.

In FIG. 22A, the classes 302'-2, 302'-3 and 302'-4, respectively, have the same predetermined relation to the key class 302'-1. The "relation" shown in FIG. 22A is the relation information described in one memory region.

In FIG. 22B, when another class is searched under a certain relation from the net parent class 302'-A, the net child class 302'B, the net child class 302'C, . . . , and the net child class 302'N are sequentially found. In addition, the net parent class 302'A is found when a search is made under a certain relation from the net child class 302'N.

In FIG. 22C, the information relating to the relationship of the two classes 302'-5 and 302'-6 exists only between these two classes 302'-5 and 302'-6.

In each of the cases shown in FIGS. 22A, 22B and 22C, the information related to "relation" or "relationship" generally exists in the memory region which is accessible in common by each of the classes, and each of the classes share the information if necessary.

Similarly to the "is-a" and "part-of" relationships described above, the lateral relationships shown in FIGS. 22A through 22C are one form of mutual relationship between the classes, and are held in the field of the static model.

Further, the present invention is not limited to these embodiments, but various variations and modifications may be made without departing from the scope of the present invention.

What is claimed is:

1. A computer-implemented object base data processing apparatus which executes a desired process by naming as objects, at least one of single processing units and composite processing units, which include combinations of the single processing units, and combines the objects by hierarchical relation with each other, said object base data processing apparatus comprising:

a parts attribute file of a computer storing the objects as object parts using entity data forming the objects and meta data describing a nature of at least one of the objects, methods and classes realizing individual processes, which are information groups in a procedural world, being stored as one object of the objects;

an object management process of the computer, coupled to said parts attribute file, communicating with the object parts in said parts attribute file to execute the desired process;

a class schema structure in the computer describing a method name for at least one method entered in a class, by combining at least one method into the class; and an instance schema structure in the computer, generating an instance schema linked to a method specified by said class schema structure, said instance including specific instance data replacing variables of general names existing within the class, the object parts corresponding to the composite processing unit linking to at least one of the methods or method groups described in said class schema structure and contents of said instance schema structure, said desired process being given by both a static model which specifies an existence of class groups and/or the method groups and mutual relationships of said class groups and/or said method groups, and a dynamic model which specifies an existence of instance groups and time sequential relationships of said instance groups, and progress of a process of the instance of the instance groups in the dynamic model being executed by collation with cause and effect relationships among classes of the class groups in the static model.

2. The computer-implemented object base data processing apparatus as claimed in claim 1, wherein:

said static model to which the classes correspond comprises mechanisms for describing mutual relationships including upper layer and lower layer relationships of a hierarchy relationship among the plurality of methods and/or the plurality of classes; and between corresponding methods and/or classes having the mutual relationship, selected methods and/or classes hold information inherited as information of second methods and/or classes.

3. The computer-implemented object base data processing apparatus as claimed in claim 2, wherein said desired process given by said static model specifies the mutual relationships to include at least one of an "is-a" relationship and a "part-of" relationship.

4. The computer-implemented object base data processing apparatus as claimed in claim 2, wherein said desired process given by said static model specifies the mutual relationships to include relationships in a same layer of the hierarchy relationship and related by relational links.

5. The computer-implemented object base data processing apparatus as claimed in claim 1, wherein:

said static model comprises a state table, said state table has contents thereof which are inspected at a start of operation of each session, and describes a result of the operation at an end of the operation of each session.

* * * * *